United States Patent
Lambert et al.

(10) Patent No.: US 7,260,774 B2
(45) Date of Patent: Aug. 21, 2007

(54) METHOD & SYSTEM FOR ENHANCED WEB PAGE DELIVERY

(75) Inventors: John H. Lambert, Devon (GB); George Semeczko, Framingham, MA (US); Geert Engels, London (GB)

(73) Assignee: Inceptor, Inc., Maynard, MA (US)

( * ) Notice: Subject to any disclaimer, the term of this patent is extended or adjusted under 35 U.S.C. 154(b) by 11 days.

(21) Appl. No.: 09/845,575

(22) Filed: Apr. 30, 2001

(65) Prior Publication Data

US 2002/0038350 A1 Mar. 28, 2002

Related U.S. Application Data

(60) Provisional application No. 60/200,205, filed on Apr. 28, 2000.

(51) Int. Cl.
*G06F 15/00* (2006.01)

(52) U.S. Cl. ............... 715/513; 715/529; 715/526; 715/501.1

(58) Field of Classification Search ............ 715/513, 715/501.1, 511, 517, 526, 799; 707/3, 4, 707/10, 201, 104.1, 102, 175, 178, 2; 705/5, 705/14; 719/315; 345/719, 853; 709/202, 709/218, 328, 219, 217; 382/173; 358/1.18; 711/122; 714/799; 717/175; 704/9
See application file for complete search history.

(56) References Cited

U.S. PATENT DOCUMENTS

| | | | | |
|---|---|---|---|---|
| 5,752,022 A | * | 5/1998 | Chiu et al. | 707/10 |
| 6,094,649 A | * | 7/2000 | Bowen et al. | 707/3 |
| 6,096,096 A | * | 8/2000 | Murphy et al. | 717/175 |
| 6,122,647 A | * | 9/2000 | Horowitz et al. | 715/513 |
| 6,269,361 B1 | * | 7/2001 | Davis et al. | 707/3 |
| 6,282,567 B1 | * | 8/2001 | Finch et al. | 709/219 |
| 6,401,094 B1 | * | 6/2002 | Stemp et al. | 707/10 |
| 6,516,311 B1 | * | 2/2003 | Yacoby et al. | 707/3 |
| 6,516,337 B1 | * | 2/2003 | Tripp et al. | 709/202 |
| 2003/0149600 A1 | * | 8/2003 | Williams | 705/5 |

OTHER PUBLICATIONS

A Web Crawler in Perl—by Mike Thomas Published Aug. 1997 Publisher: Linux Journal.*

* cited by examiner

*Primary Examiner*—Heather R. Herndon
*Assistant Examiner*—Quoc A. Tran
(74) *Attorney, Agent, or Firm*—Clock Tower Law Group; Erik J. Heels; Joshua D. Mather

(57) ABSTRACT

A system for and method of enhancing web page delivery. The invention provides the ability to control redirection of Web traffic of humans and search engine spiders. It can differentiate between these types of visitors to a Web page, track their movements, log critical information, and analyze the Web traffic in order to judge the success in driving quality traffic to some known goal on a Web site, such as a sale. The system may generate dynamically optimized web pages targeted to specific search engines, in order to optimize the search engine ranking and visibility of a Web site, such as an online marketer's Web site.

23 Claims, 14 Drawing Sheets

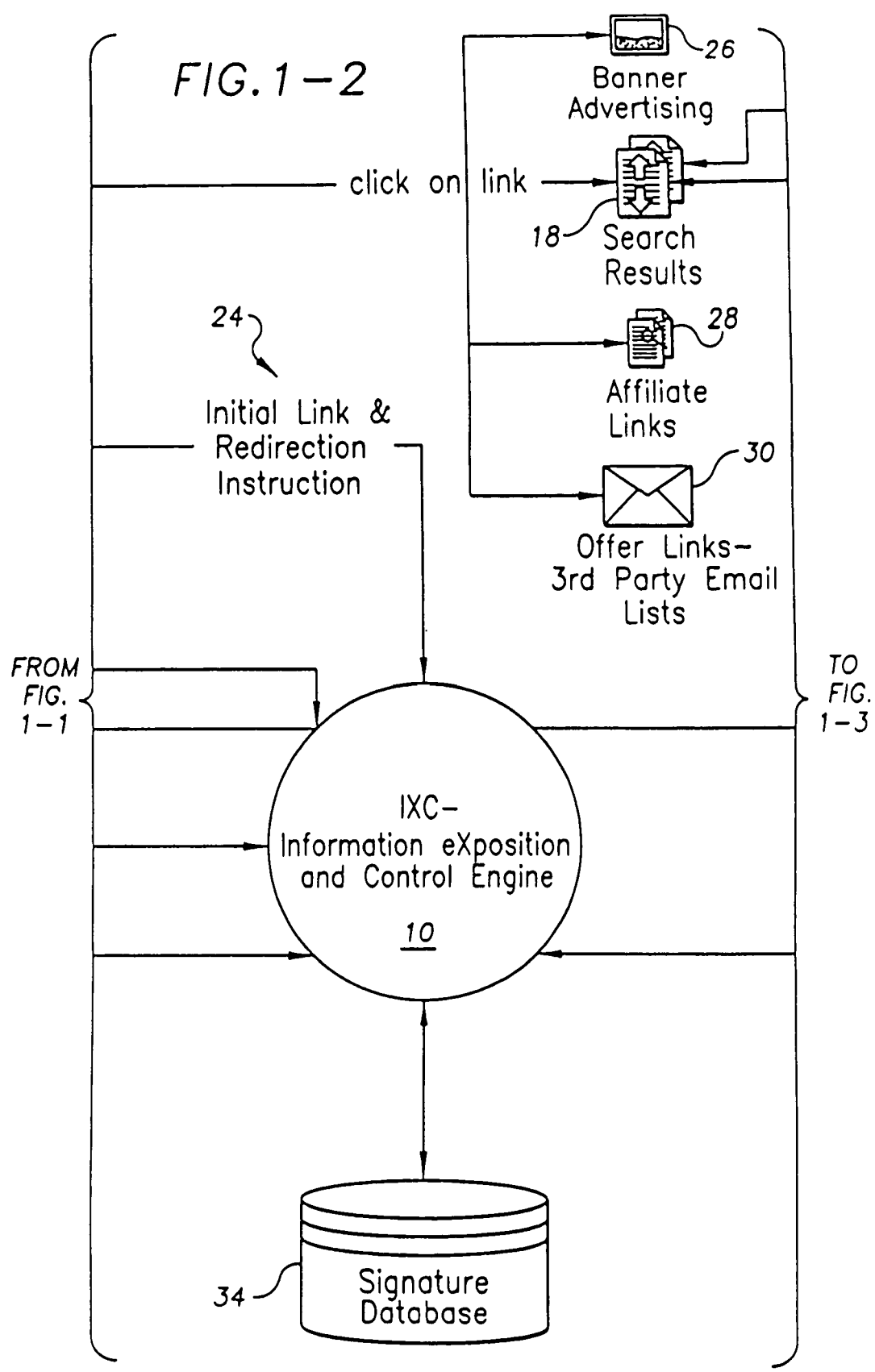

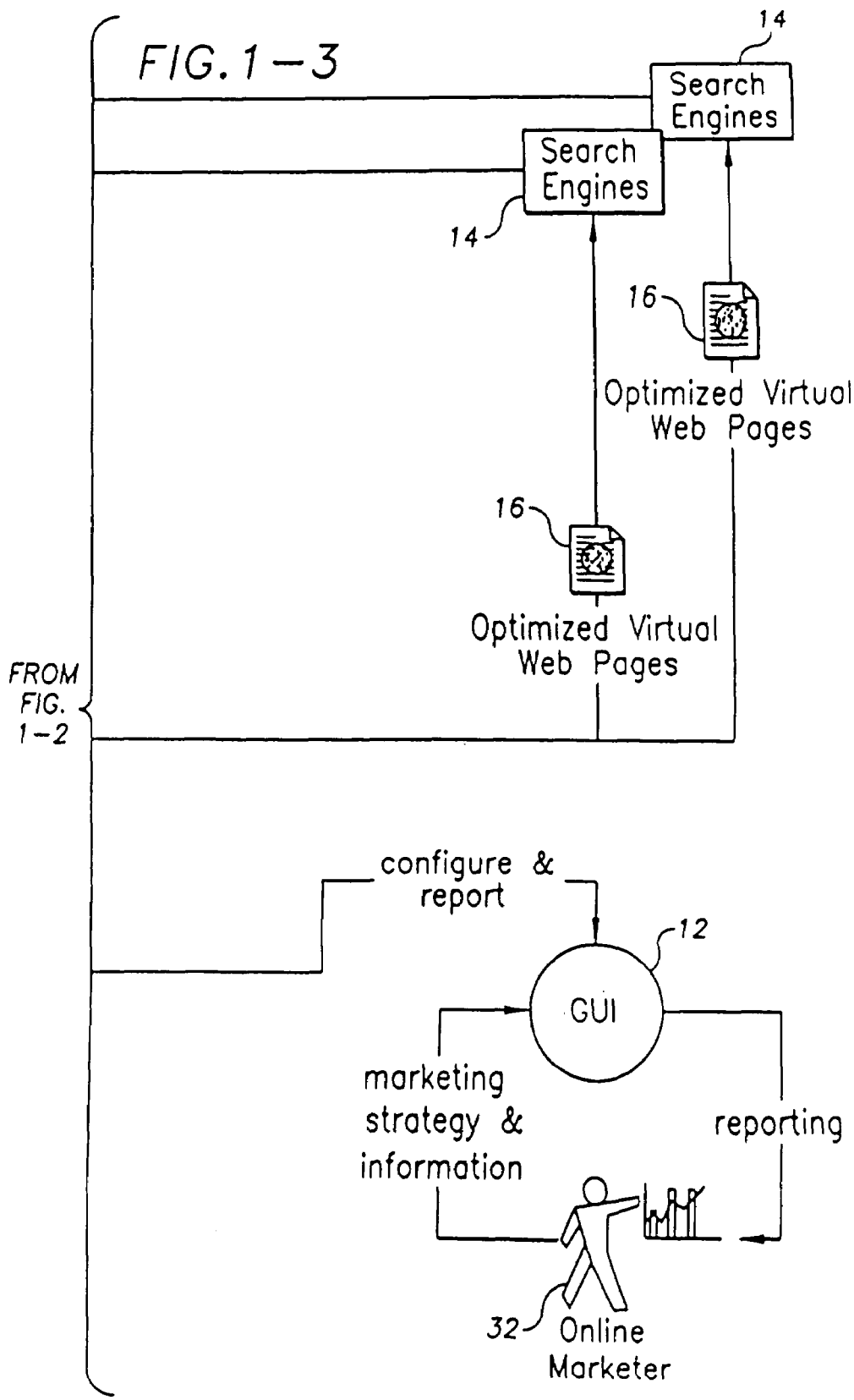

201
Main Process

Perform Action Process

Redirect & Track

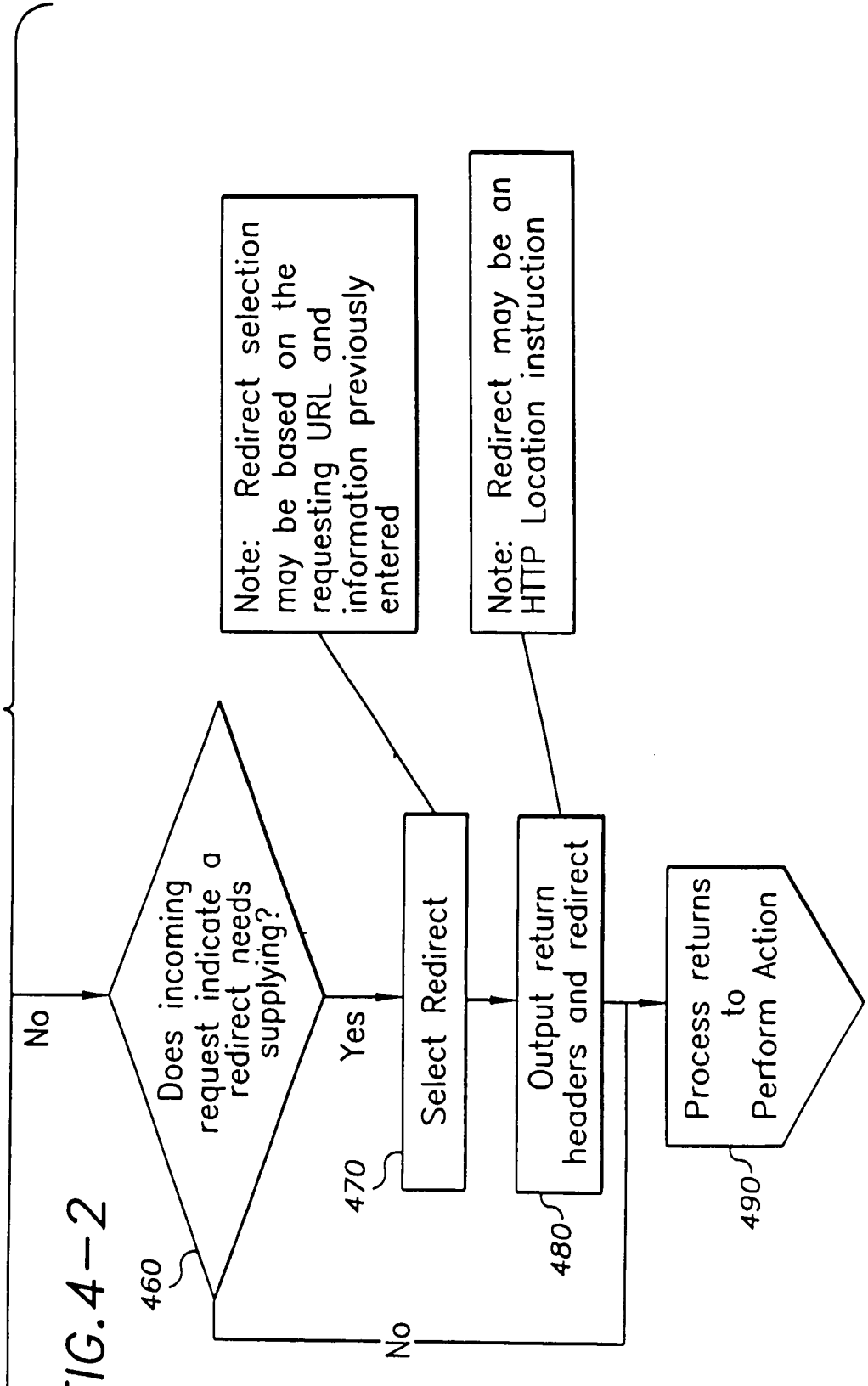

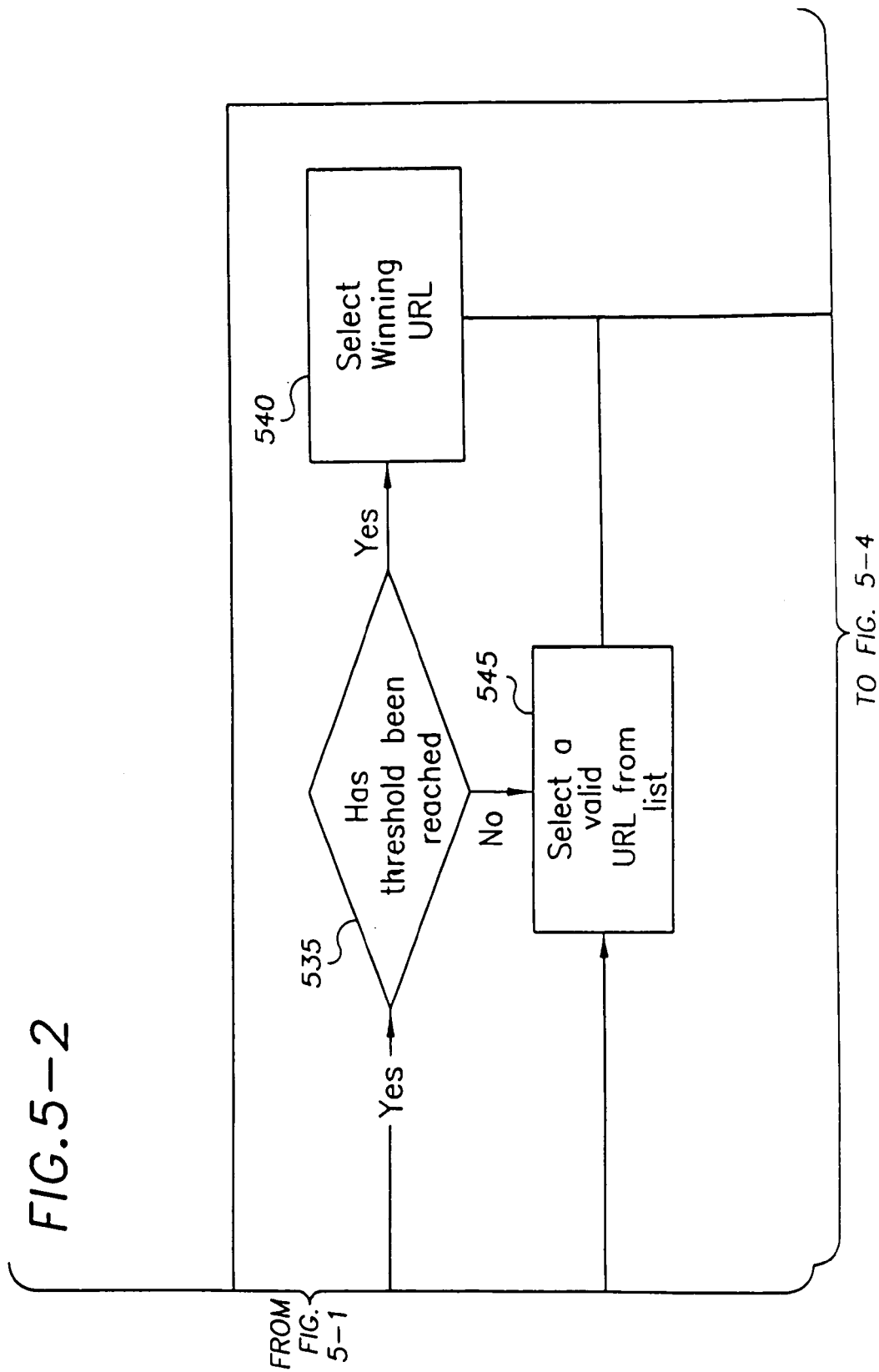

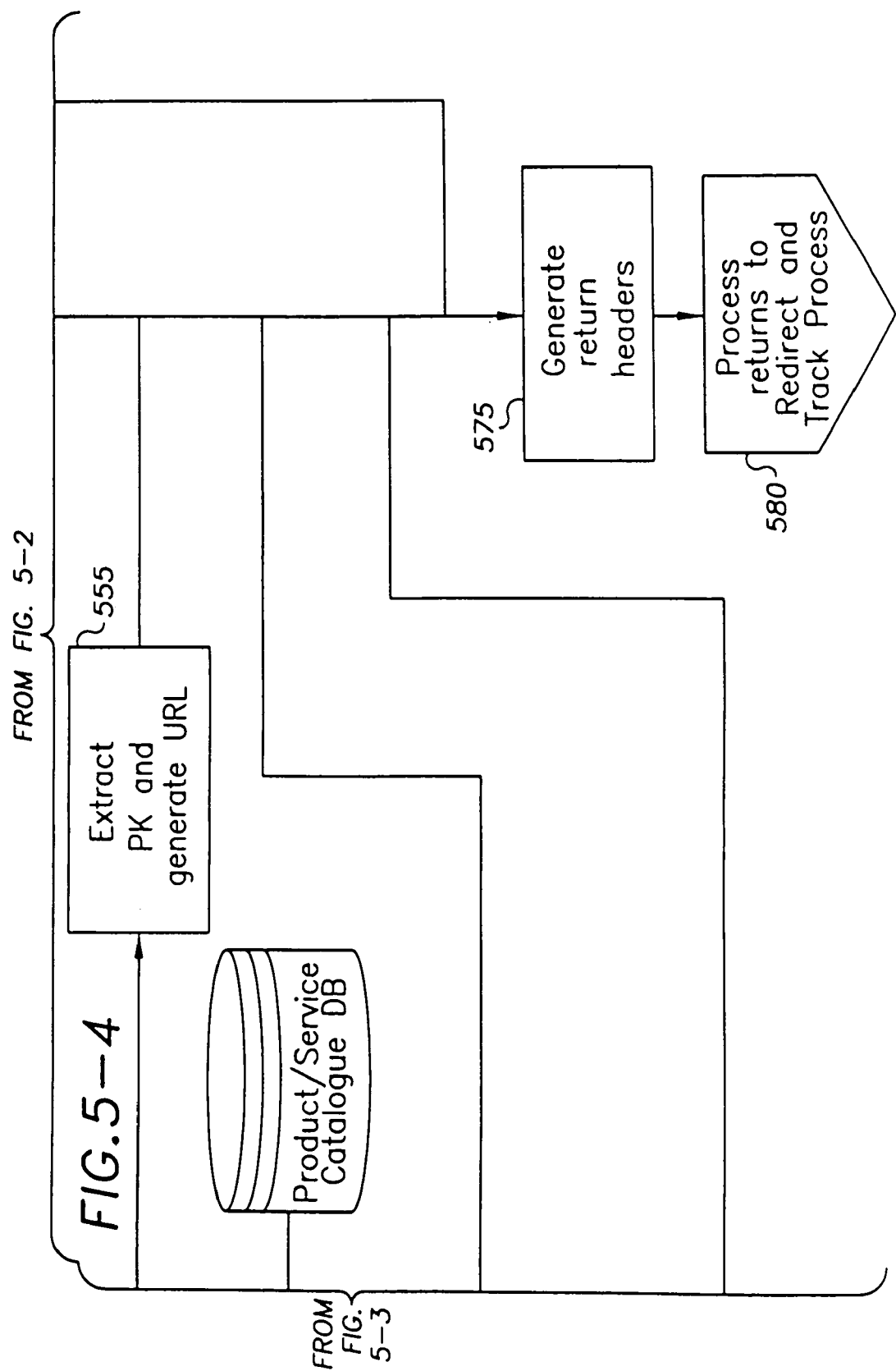

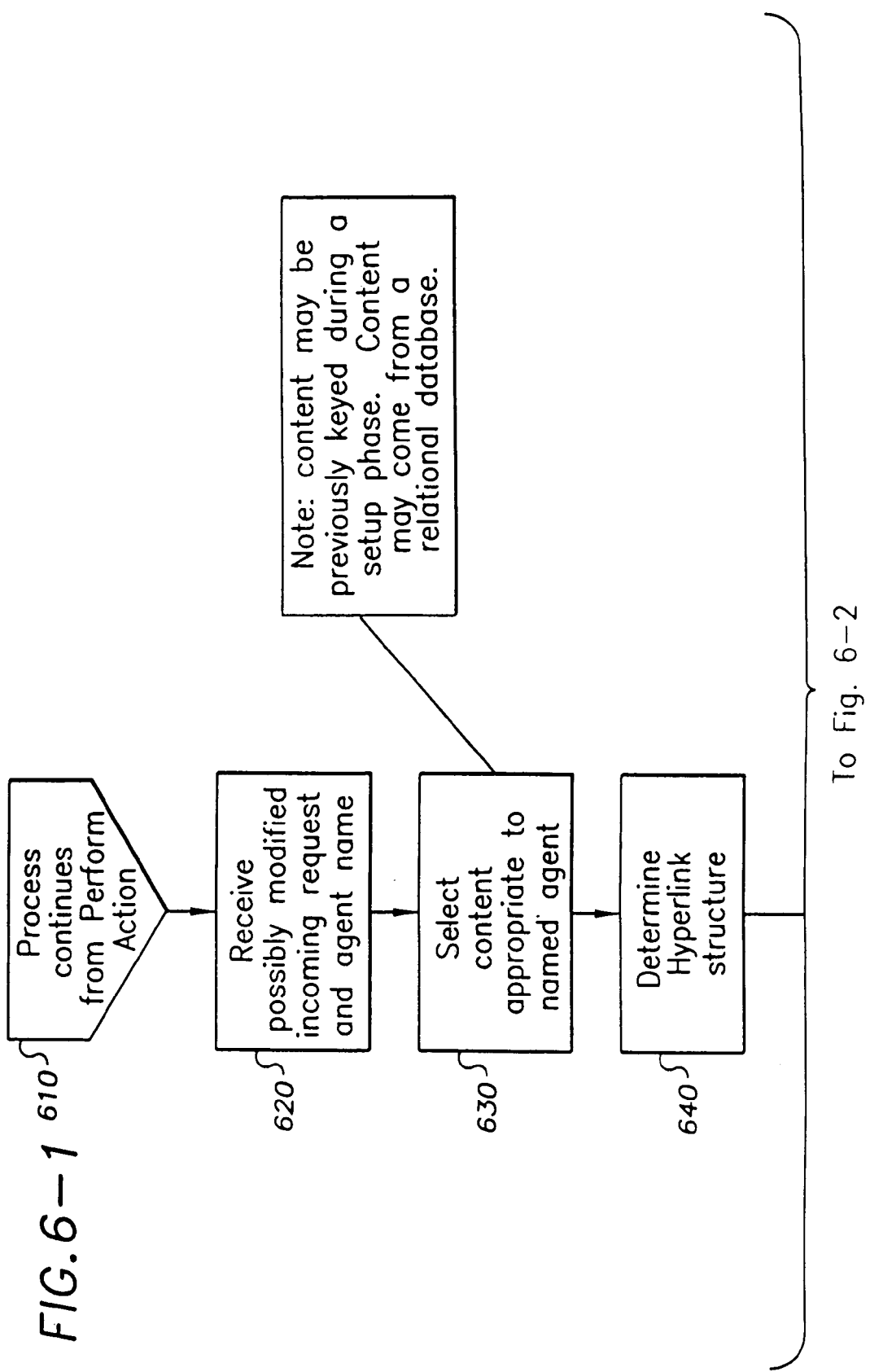

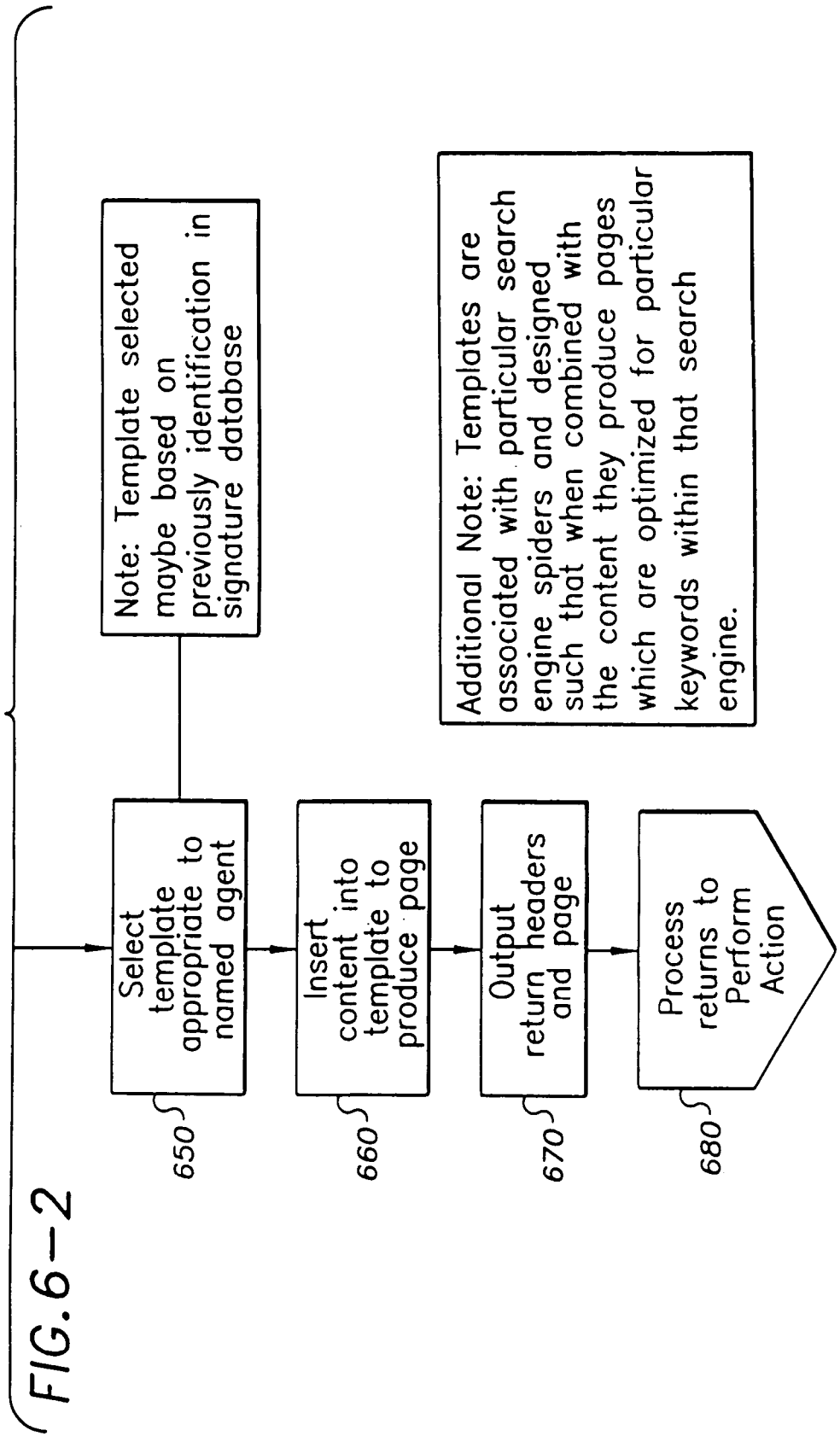

METHOD & SYSTEM FOR ENHANCED WEB PAGE DELIVERY

This application claims the benefit of U.S. Provisional Application No. 60/200,205, filed Apr. 28, 2000, the contents of which are herein incorporated by reference in their entirety.

FIELD OF THE INVENTION

The present invention relates generally to the enhancement of Web page delivery. More specifically, the invention employs techniques in identifying visitors, both humans and search engine spiders, and appropriately redirecting them to specific Universal Resource Locators. The invention employs templates and generates virtual Web pages optimized for particular search engines. Thus, the invention has application in the field of electronic commerce.

BACKGROUND OF THE INVENTION

The ability to manage and control the typical Web site has become an increasingly demanding task. This is due to the complex nature of Web sites and their use of various technologies that provide dynamic content with the aid of complex content management systems utilizing database systems. These Web sites are designed to provide the optimal experience for the human user. This is often done by using sophisticated graphics and multimedia to provide a highly visual and personalized experience for visitors. For the online marketer, all these factors provide a difficult environment for them to do their job of ensuring high visibility of their Web site, analyzing customer behavior and then acting on that behavior in a timely and responsive fashion.

From the situation described above, three primary factors for which help is required may be identified: visibility, control and analysis.

"Visibility" involves all the points of presence that a Web site provider has on the Internet that allow visitors to find links to the provider's Web site. This could include:

Search results in search engines
Banner advertisements
Affiliate Links
Promotional Emails which include Links In each case a Universal Resource Locator (URL) or Web address is provided that allows visitors to click on and find a page within the provider's Web site.

Search engine visibility is extremely difficult as search engines typically use programs called "spiders" to visit Web sites, parse the text and then determine what terms, known as a keyphrase, best describes a provider's Web site. Such a process precludes search engines from seeing the bulk of most Web sites as they are only able to see the text on static Web pages and not the dynamic content held in databases nor the content held in graphics and multimedia. This situation leads search engines to often misrepresent or under-represent Web sites and the content they hold. To compound the problem, each search engine uses different criteria for ranking making it even more difficult to find a single page structure that appeals to them all. This also has an impact on the available number of pages that visitors doing searches could be directed to in order to find the content they are after. The visibility problem has been dealt with in the past by creating "doorway" pages for both people and search engines to enter through, but while this is a refinement of the problem it does not solve the problem as a balance between what the search engines see and what people see must still be struck.

"Control" relates to the ability, when directing visitors to a provider's Web site, to send them to the appropriate "landing point". That is, send them to the most appropriate page rather than just to the Home page of the Web site. This is often a difficult task, especially when it is desired to change the page to which to direct visitors. In some cases, this is just not possible. For example, with search engines, if a page is indexed, the URL to which visitors will be directed cannot be "changed" at all. Similar cases with varying degrees of difficulty can be made for banner advertisements, affiliate links and promotional emails.

"Analysis" is most important to judge the success of the Visibility and Control aspects of the process with respect to driving quality traffic to some known goal in a provider's Web site such as a sale for example. Thus, analysis in this case should provide the maximum amount of information between source and sale. While analysis of Web traffic is quite common, it is limited in its ability to easily identify the source of the traffic and also in how well integrated it is with the Visibility and Control aspects. Having determined successes and deficiencies, it is necessary to be able to easily and in real time make changes to the Visibility and Control aspects. If possible, some situations should be handled automatically. Existing solutions track traffic once it comes to a provider's site but only determine its source with a great deal of work and often requiring changes to the Web site to do so. These solutions have no integration with the Visibility and Control aspects.

SUMMARY OF THE INVENTION

In one aspect, the present invention is a method of enhancing web page delivery, comprising the steps of: receiving a request for a web page content from a requestor; identifying the requestor as either a human visitor or a search engine spider; and redirecting identified human visitors to a web page in an existing web site. The system may, for identified search engine spiders, dynamically generate one or more web pages optimized for the particular search engine spiders, and return generated web pages to the identified search engine spider.

Different web pages may be dynamically generated depending upon the particular search engine spider identified as the requestor. Updateable templates are merged with user entered data or information stored in a catalog database to dynamically generate the one or more web sites. In another aspect, the present invention is an apparatus for practicing the methods described above.

BRIEF DESCRIPTION OF THE DRAWINGS

FIG. 6 is a flow diagram illustrating an optimized dynamically generated page process.

DETAILED DESCRIPTION

Figure 1:
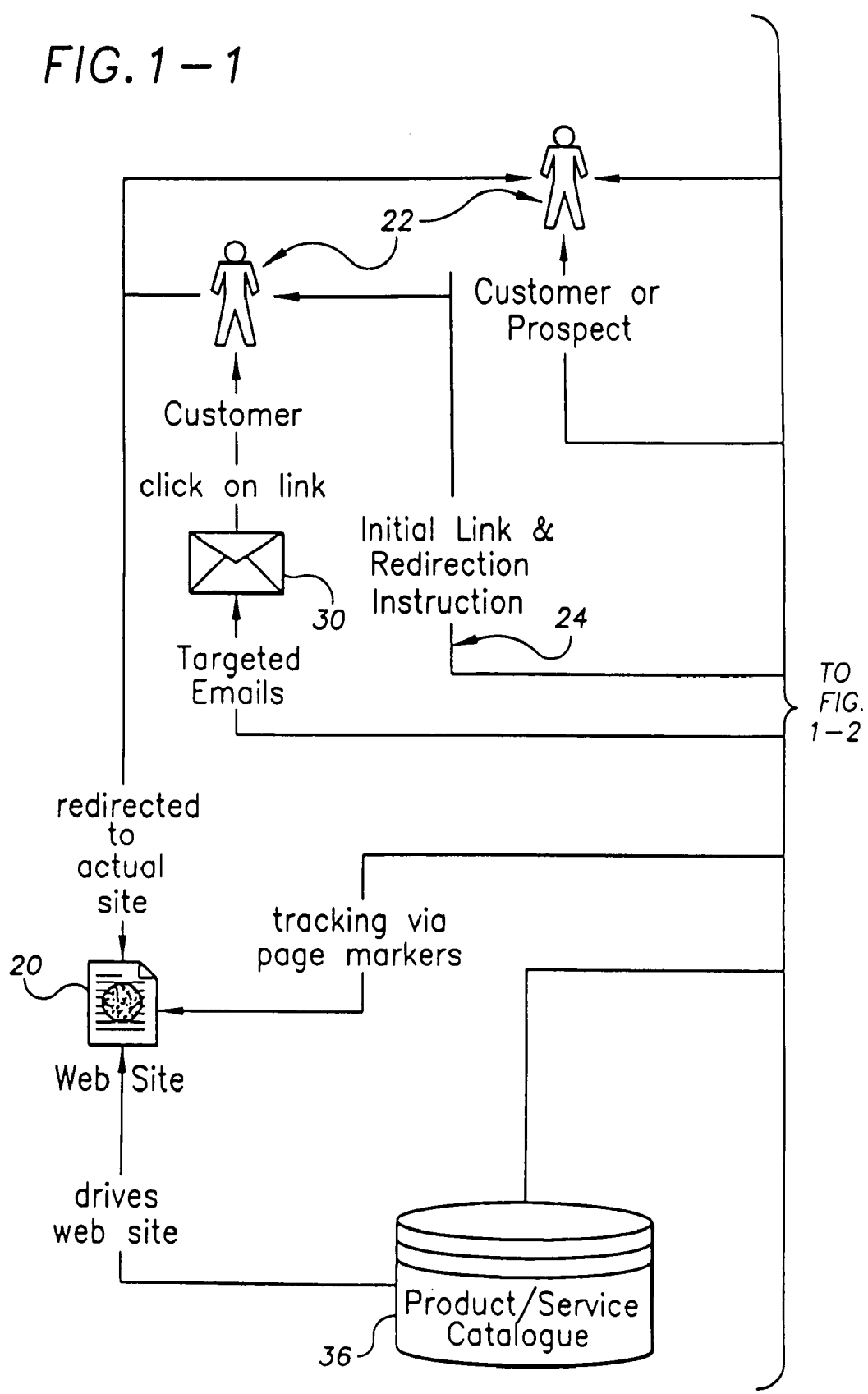
FIG. 1 is a schematic diagram of an aspect of the system in its environment of use.

In one aspect, the invention is a system (e.g., a method, an apparatus, and computer-executable process steps) for dynamically generating web pages for search engine spiders while redirecting human visitors to a web page in an existing web site.

Preferred embodiments of the system of the invention will now be described with reference to the accompanying drawings. The system is described below in terms of both overall methodology and a physical implementation in an actual working software application, termed the "Information Exposition and Control Engine", or more briefly "the IXC Engine". The system is intended to be integrated with technology that delivers Web pages and is invoked during the initial stages of the Web page delivery process.

A. High Level Description

The IXC Engine leverages the hypertext transfer protocols to control where a requested web page is held. Accessing a Web page typically is accomplished by the following steps:

- A user types a URL into his browser;
- The browser locates a Web server holding that URL utilizing a Domain Name Server (DNS);
- The browser sends a request to the located Web server for the desired page;
- The Web server obtains the browser's request and processes it;
- If the desired page is held at that site, the content of that page along with a satisfactory response code are returned;
- The Web browser receives the Web server's response and any content or data along with the response code; and
- If the response code indicates a successful interaction, the Web browser will present the Web page contents according to the instructions on that Web page.

During this interaction, the Web server may perform other actions. This may include communicating to the Web browser that the desired page no longer exists at that Web site and indicating the new location for the page. This may be a permanent or a temporary relocation. In either case, the Web browser will accept this new location and send another request for the desired page and the new location. In this scenario, the steps of accessing the desired page could comprise:

- A user typing a URL into his browser;
- The browser locating the Web server holding that URL utilizing a Domain Name Server (DNS);
- The browser sending a request to the located Web server for the desired page;
- The web server obtaining the browser's request and processing it;
- If the page is now held elsewhere, returning the new URL for use in locating the desired page and a response code indicating if this relocation is temporary or permanent;
- The Web browser receiving the Web server's response, the relocated URL and the response code;
- The web browser locating the new URL using a Domain Name Server;
- The browser sending a request to the newly located web server for the desired page;
- The Web server obtaining the browser's request and processing it;
- Returning the content of the desired page if held at that site with a satisfactory response code;
- The Web browser receiving the Web server's response and any content or data along with the response code; and
- If the response code indicates a successful interaction, the browser presenting the Web page contents according to the instructions on that Web page.

The IXC Engine uses this ability to handle requests and issue relocation responses to not only control where requests are sent, but also to generate Web page contents when needed. The remainder of this section discusses how this technique furthers the enhanced Web page delivery objective of the invention.

FIG. 1 depicts an environment in which the IXC Engine 10 and its associated graphical user interface 12 operate to provide a solution to the problems described in the "Background" section of this application.

Note that search engine search results 18 are obtained by presenting to search engines 14 (via their spider programs) optimized virtual Web pages 16 especially tailored for each of the search engines 14. The optimized virtual Web pages 16 result in URLs that point back to IXC Engine 10 via a network such as the Internet.

IXC Engine 10 interacts (via a browser not depicted) with a customer or prospect 22 when he clicks on a link 24 that has been created through the IXC Engine 10 and then distributed across the Internet via Banners 26, Affiliate Links 28, search engine results 18 or E-mails 30. Whenever a customer or prospect 22 clicks on one of these links 24, they are redirected to the appropriate page on an actual web site 20.

All actions taken, whether the actions are visits by search engine spiders or redirections, are logged and reported to an Online Marketer 32 who configures the IXC Engine via graphical user interface 12. Customer or prospect 22 navigation through Online Marketer's Web site 20 can also be tracked and reported through image tags placed on each web page.

B. Lower Level Description

Figure 2:
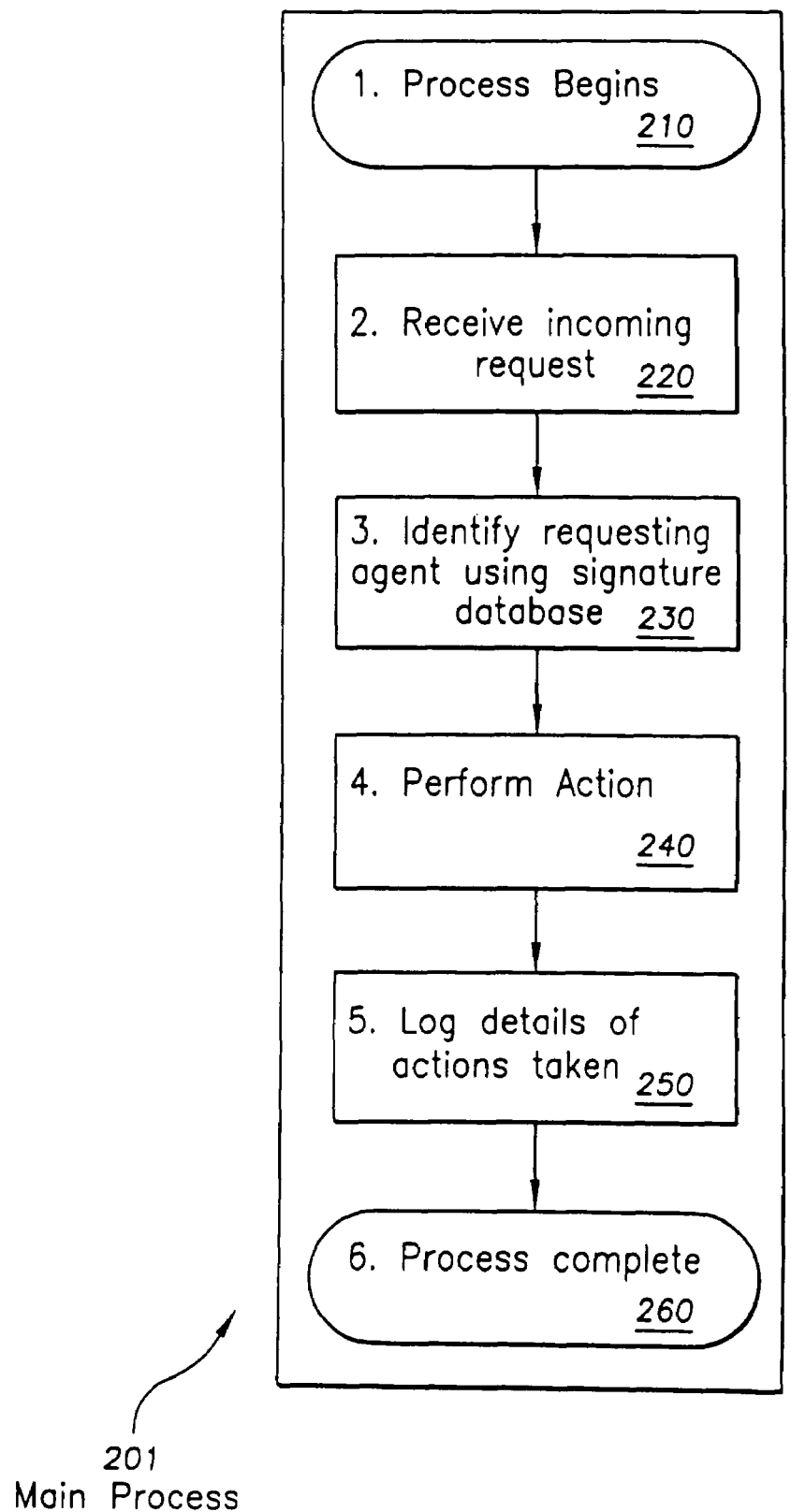
FIG. 2 is a flow diagram illustrating the main process of the invention.
Figures 1, 3:
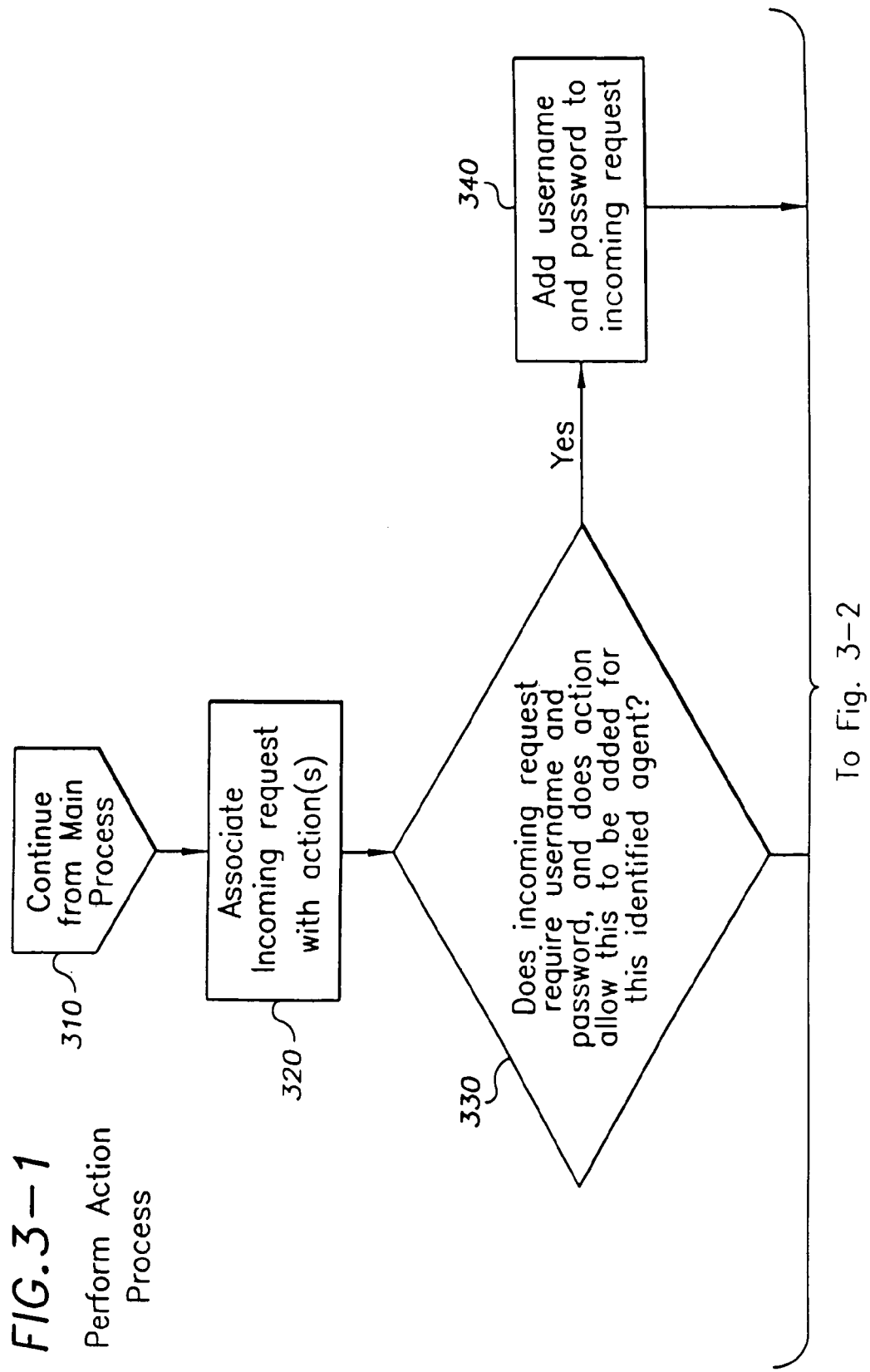
FIG. 3 is a flow diagram illustrating the perform action process.
Figures 2, 3:
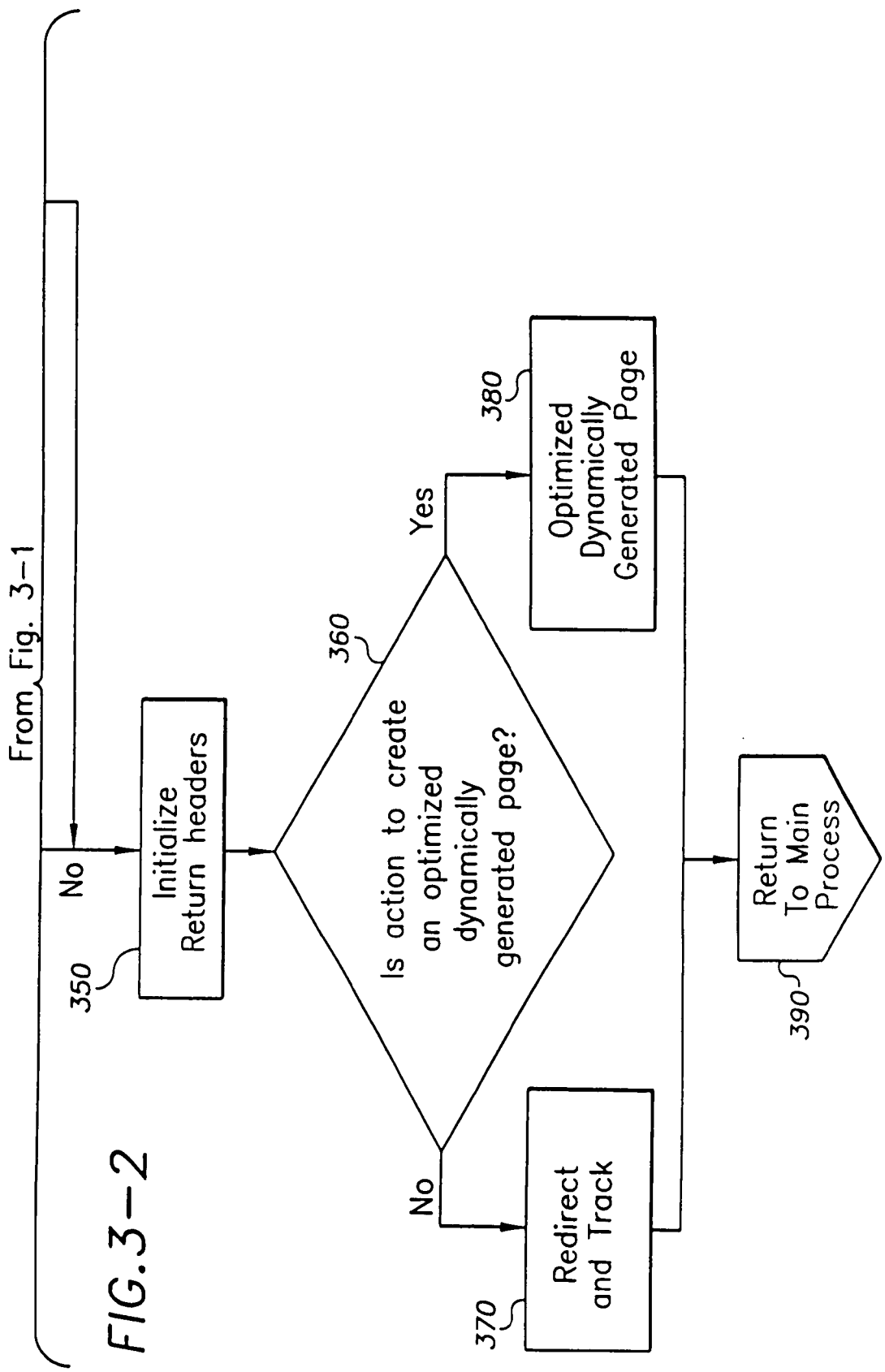
Figures 1, 4:
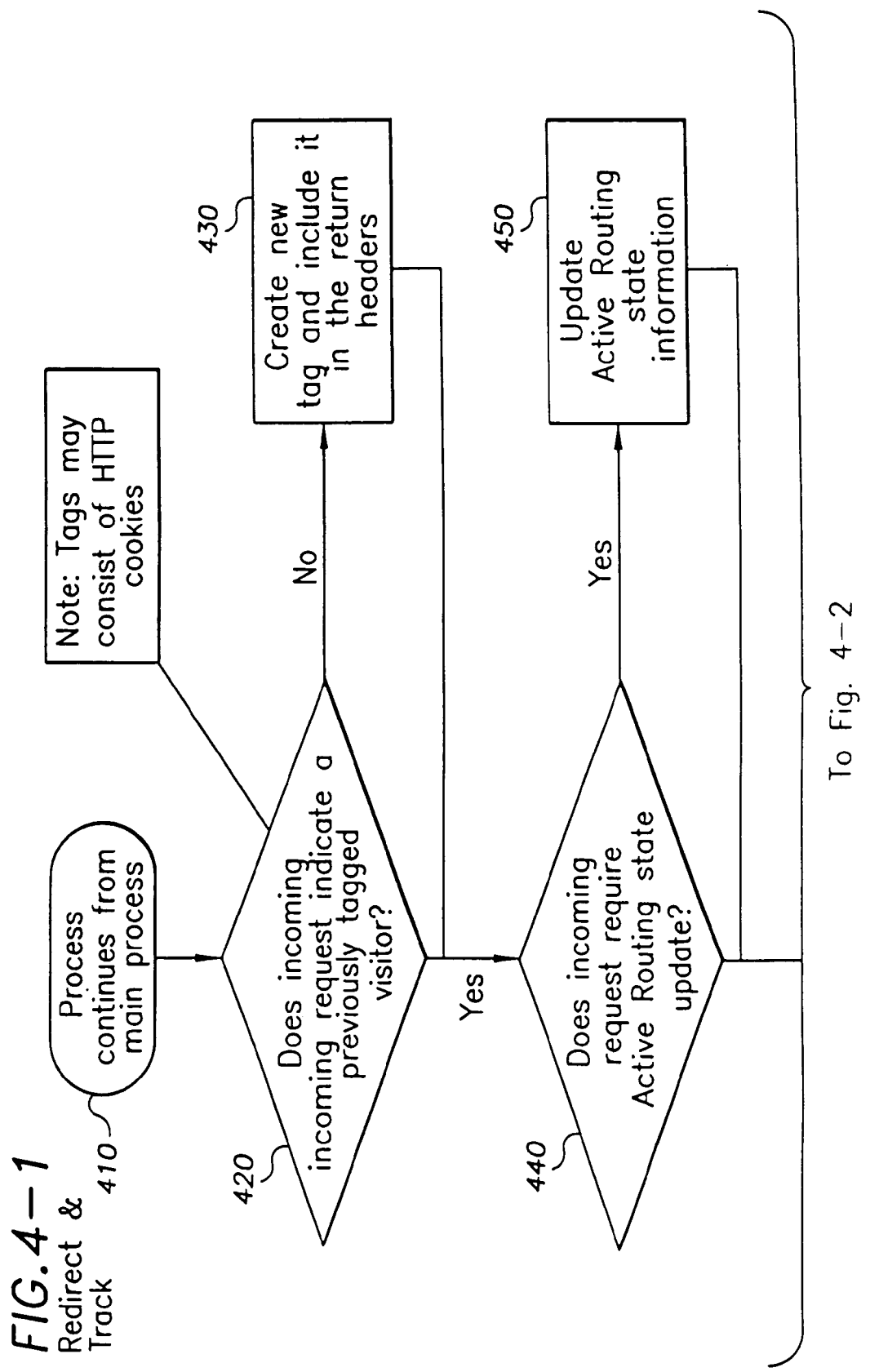
FIG. 4 is a flow diagram illustrating a process of redirecting and tracking actions used in the system.
Figures 1, 5:
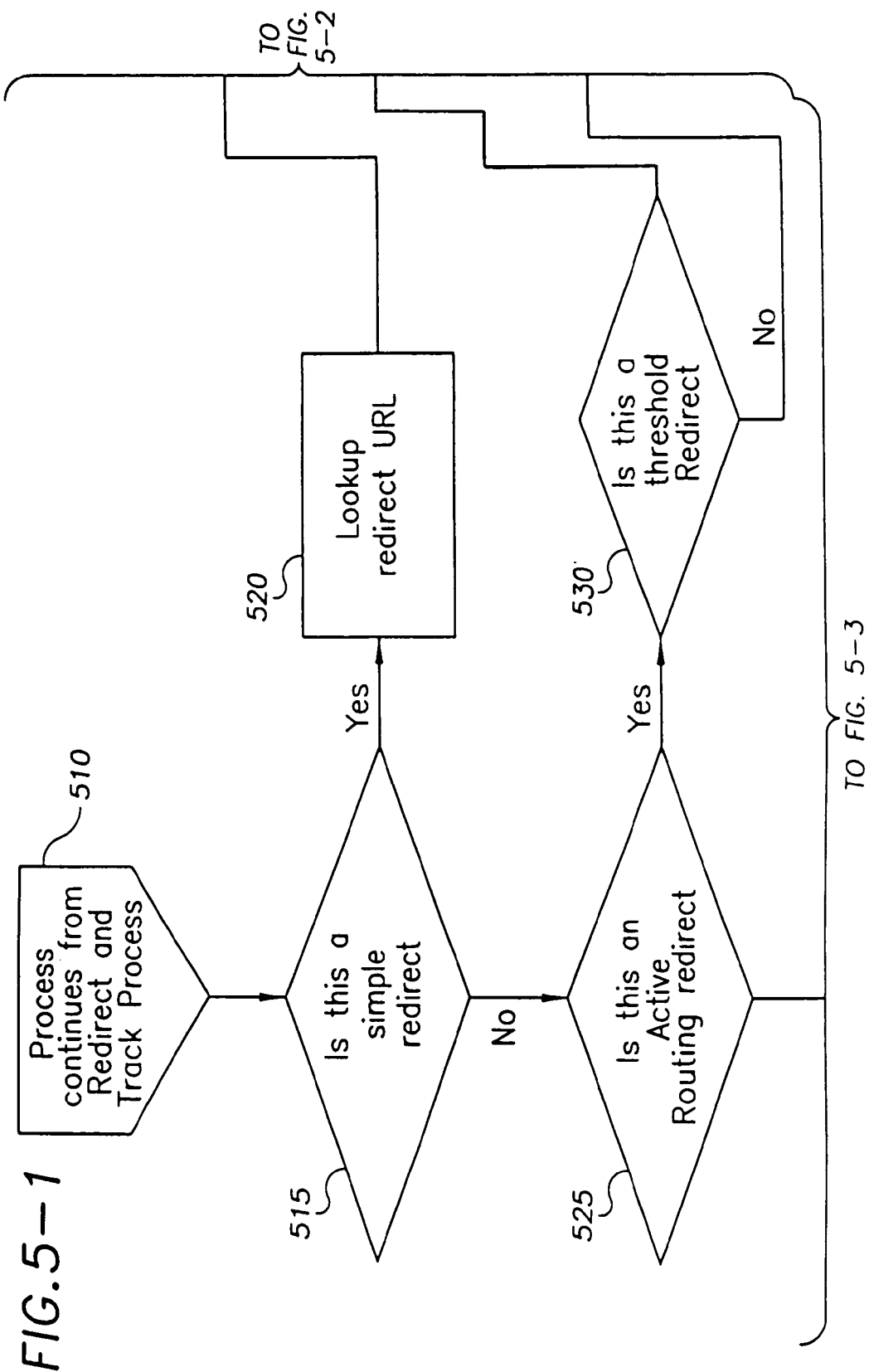
FIG. 5 is a flow diagram illustrating a redirection selection process used in the system.
Figures 3, 5:
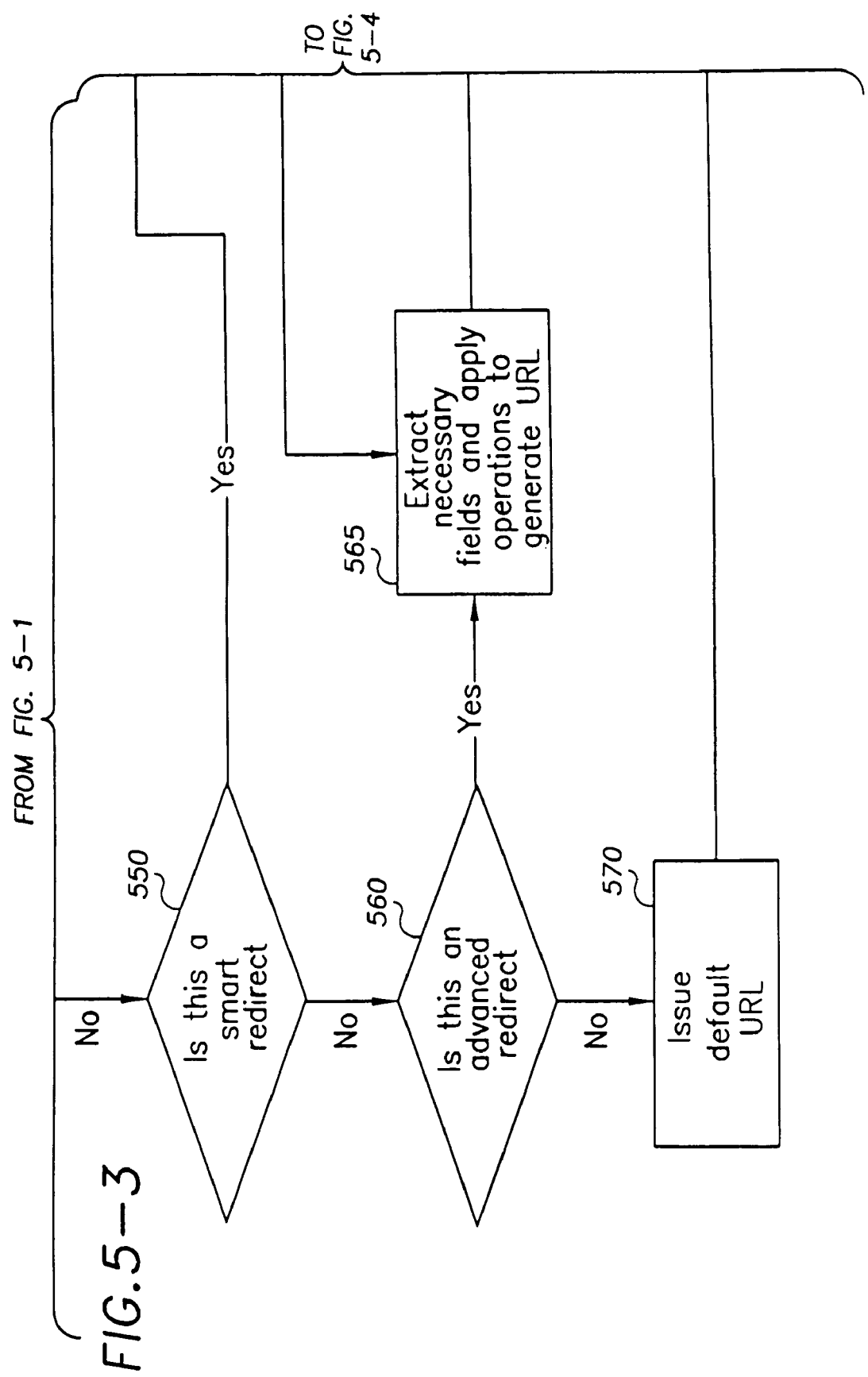

Below are described the primary processes of an embodiment of the invention: a main process shown in FIG. 2; a perform action process as shown in FIG. 3; a redirect and track process as shown in FIG. 4; a select redirect process as shown in FIG. 5; and an optimized dynamically generated page process as shown in FIG. 6. Describing these as separate processes is for ease of explanation only, and is meant by no means to be limiting. Indeed, one skilled in the art should easily envision other program structures not organized into five processes that still fall within the scope of the present invention.

Several definitions will aid in the description:

- The Web delivery process is via a Web server. IXC Engine 10 can either run on the same Web server as the actual web site 20 or it can run on a separate Web server. The Web server that hosts IXC Engine 10 has part of IXC Engine 10 running as a plug-in to that Web server using its Application Programming Interface.
- In delivering a Web page, the Web delivery process is responding to an "incoming request".
- "Return headers" are one part of the package of page content that the process needs to generate. Specifically, the "return headers" contain information about the content, rather than being the content itself.
- The "requesting agent" is the entity that is sending the incoming request.
- A "signature database" is a means of assigning a name to the requesting agent. Each requesting agent has characteristics described in the signature database and these characteristics map to names.
- The redirection is performed by issuing a return header that has an HTTP protocol identifying a temporary redirect.

A "spider" is a search engine's requesting agent, sending incoming requests to obtain Web pages for evaluation.

A "keyphrase" is what a customer or prospect 22 enters into a search engine to obtain a list of Web pages about that topic.

A "tag" is used to keep track of individual customers or prospects 22 who visit the Web page. Different visitors will have different tags. New visitors will not have been given tags previously.

Main Process

Main process 201 is depicted in FIG. 2, and may be comprised of the following steps:

Step 210—Main process 201 begins, having control handed to it from the Web delivery process, normally controlled by the Web server.

Step 220—Receive an incoming request. This is the request for a Web page that the Web delivery process has received.

Step 230—Identify requesting agent using signature database. Now the requesting agent has a name. Typically spiders are individually identified and human visitors are identified as such. Other identifications include human visitors from a particular organization, etc.

Step 240—Based on the signature identification and the request, perform a particular action. The action may include tracking the visitor, generating an optimized page dynamically, etc. The details of this process are described in the next section.

Step 250—Prior to ending main process 201, log the details of the actions that have been taken for future reporting.

Step 260—Main process 201 is complete.

Perform Action Process

The individual steps which comprise the Perform Action Process 240 are illustrated in detail FIG. 3. In this process, the required actions are determined and performed. The steps which comprise this process are as follows:

Step 310—Program control is picked up from main process 201.

Step 320—Associate incoming request with action(s). The incoming request may trigger one or more actions to be carried out shortly. This includes tracking the visitor, generating an optimized page dynamically, etc. For the moment, simply note the actions required, if any and take them.

Step 330—Determine if the incoming request is a request for a password protected page. Determine whether the associated actions indicate a username and password has been stored previously that can be given to the agent (who is now named).

Step 340—If the answer to the determination of Step 330 was in the affirmative, the username and password are added to the incoming request. This request will now be able to access a password protected system imposed by the Web delivery process, if and when control is returned to it.

Step 350—Initialize return headers. Any basic standard information may be included here.

Step 360—Determine whether the identification/request pair indicate the need to create an optimized dynamically generated page. The answer will usually be a "yes" for agents named as spiders and "no" for human visitors, but human visitors may have page contents generated for them as well.

Step 370—If the answer to the determination made in Step 360 is "no", then program control flows to the Redirect and Tracking Process.

Step 380—If the answer to the determination made in Step 360 is "yes", then program control flows to the Optimized Dynamically Generated Page Process.

Step 390—Pass control back to Main Process 201.

Redirect & Track Process

In this process, the appropriate redirection and tracking actions are determined and performed. FIG. 4 depicts the steps in this process:

Step 410—Program control is picked up from the "Perform Action" process 240.

Step 420—Determine whether the incoming request indicates a previously tagged visitor.

Step 430—If the answer to the query of Step 420 is "no", then create a new tag for that visitor and include it in his return headers. Thus, when this visitor returns he will do so with this tag.

Step 440—Determine whether the incoming request relates to a URL that requires the update of active routing state information. This occurs when the decision process for redirection is based on previous traffic visits or redirections. Update of the active routing state information could include any form of numeric updates whether representing a dollar value or traffic number.

Step 450—If the answer to the query of Step 440 is "yes", then update the relevant active routing state value, such as the indication that a particular page has been reached by a particular visitor.

Step 460—Determine whether the incoming request requires a redirection. If no, return program control to the "Perform Action" process 240.

Step 470—If redirection is required, then perform "Select Redirect" process (shown in FIG. 5).

Step 480—Output the updated headers returned from the previous step.

Step 490—Return to the "Perform Action" process.

It should be noted that using a redirect for an image allows Web site providers to place image markers on their Web site that will redirect to an invisible image but produce traceable logs indicating which pages each visitor visits. A cookie/redirect image pair can be used to identify a visitor and log the visitor's path through a Web site. The visitor is identified only by the information held in the cookie that is nothing other than a unique number.

Select Redirect Process

In this process, a detailed redirection is selected. FIG. 5 depicts the steps of this process:

Step 510—Program control is received from the Redirect and Tracking process.

Step 515—Determine whether the current redirect is a simple redirect (e.g., a fixed URL). If "yes", then perform skip to Step 520, otherwise continue from Step 525.

Step 520—Lookup the redirect URL to be used in the return header.

Step 525—Determine whether this is an Active Routing URL. If it is, checking and updating of state information is required. If it is an Active Routing URL, perform Step 530, otherwise continue from Step 550.

Step 530—Determine whether the present redirect is a threshold redirect—that is, does state information require checking and updating before a redirect decision is made. If "yes", perform Step 535, otherwise perform Step 445.

Step 535—Check the threshold state information. If it has been reached—then perform Step 540, otherwise perform Step 545.

Step 540—If the threshold has been reached, the state information needs to be updated and the relevant ("winning") URL chosen for the header, with all subsequent requests for this threshold test going to this URL.

Step 545—As a number of URLs may be chosen at this stage—choose a valid one using the appropriate mechanism (random or round-robin) from the valid URLs.

Step 550—Determine whether the present redirect is a "smart redirect". A "smart redirect" involves a simple redirect with the inclusion of a primary key from a database that can be included in the URL to allow for the selection of a dynamic page at the redirect website. If this is a "smart redirect", perform Step 550, otherwise continue with Step 560.

Step 555—For a "smart redirect", extract the primary key and generate a URL using this primary key.

Step 560—Determine whether the present redirect is an "advanced redirect". An "advanced redirect" uses pattern matching processes to generate a URL. If this is an "advanced redirect", proceed to Step 565, otherwise continue at Step 570.

Step 565—For an "advanced redirect", pattern matching may be based on the referring URL as well as using any fields in the database being used for the content visibility of which "advanced redirect" is a part. Multiple patterns may be defined with different generation code depending on the URL to be created. This step generates a URL using any information available from the referring URL or the database connected thereto.

Step 570—If none of the other "create-URL" schemes are valid, then generate a default URL.

Step 575—At this point one of the previous steps has resulted in the generation of an appropriate URL. From the URL a header with a URL in the correct format is created for ultimate use in a return header to the requesting browser.

Step 580—Return control to the "Redirect and Track" process.

Optimized Dynamically Generated Page

In this process, optimized web pages for search engines are generated. FIG. 6 depicts the steps in this process.

Step 610—Process continues from the "Perform Action" process.

Step 620—In this step the process accesses the request which has been identified as requiring a web page generated for it.

Step 630—Based on the request, the appropriate content data is accessed from either a data store held in the IXC Engine (data was entered manually) or from a datastore external to the IXC Engine which could be a database.

Step 640—Based on the request, the appropriate Hyperlink structure will be chosen. For manually entered text a multi-tiered structure will be created giving the appearance of multiple web pages connected to support the keyphrase being promoted and hence accessed by the request. For content accessed from an external datastore, a single web page will be created (links will exist in this page to many other pages represented in this same datastore). Additional links can also be included to promote other keyphrases and/or records in other datastores.

Step 650—Based on the request and the requester the most appropriate template is selected. This template indicates the best method to present the data content accessed in step 630. A different template can exist for each search engine. A template can also be used for human visitors which could include identification based on some browser criteria, e.g. create a web page for a Mobile Telephone browser.

Step 660—Merge the content from 630 and the template from 650 to produce the appropriate page.

Step 670—Output the merged information in the form of headers and page information that can be read by browsers.

Step 680—Return control to the "Perform Action" process.

Configuring and Reporting

To assist in operating IXC Engine 10, it is necessary to have a user-friendly graphical user interface (GUI) 12 to configure the settings. For example, GUI 12 is employed in changing the redirect URL for simple redirects and the specifications for more complex redirections.

A reporting module operated through GUI 12 may report all information captured throughout the previously described processes, and access the real time state information mentioned for Active Routing. From the captured information it is possible to:

Identify the number of unique customers or prospects 22 ("visitors") being directed to a site through each of the channels (each referring URL that directs to the Inceptor server).

Generate click stream analysis from tracking URLs.

Determine conversion metrics (a visitor reaching a particular page) along with any additional referral information available upon reaching that page (e.g. dollar value of an order).

Identify the number and frequency of search engine spider visitors.

All of the information described above can be generated in simple report formats in real time to show the most up-to-date state information. Aggregation of all the data, or select portions such as groupings of traffic channels data, may be performed to provide this information on a daily, weekly or monthly basis. Consequently, a detailed "media-mix" analysis can be performed to provide accurate cost benefit analysis across all traffic channels based on cost of acquisition (e.g. cost of banner advertisements) and their value (e.g. value of each sale where a sale is marked as a conversion).

A real time tracking interface is also provided to allow selective tracking and monitoring of URLs. Monitoring allows a person, such as an online marketer 32, to see the number of visits to a particular page and if appropriate the value of the conversion.

C. Description of a Preferred Embodiment

This section includes a description of a preferred physical embodiment of the inventive system. Each of the process steps described in the previous section are not all described again, but instead some specific examples are provided in order to demonstrate in specific terms how the invention might operate.

The Plug-In

A plug-in is required when IXC Engine 10 is operating on the same Web server as the web site 20 to which it is redirecting traffic. This plug-in is needed to differentiate which requests are coming to IXC Engine 10 and which should be passed onto the Web site 20. This is determined by the URL requested. If the URL requested is one used by IXC Engine 10, then it is handled by IXC Engine 10, otherwise it is handled by the Web server as it would have normally.

A preferred deployment is to operate IXC Engine 10 on a separate dedicated Web server using a subdomain of the actual web site's domain name. That is, if the domain name used by the web site was www.inceptor.com, then the domain is inceptor.com and a subdomain could be www2.inceptor.com. Different Web servers may use subdomains of the same domain and still share cookies associated with the same domain. This is important when using cookies between web servers for the purpose of identification and ongoing tracking across those web servers.

Identifying Agents and Spiders

The ability to differentiate agents and spiders and thus identify human visitors (customers or prospects 22) is accomplished by examining the User-agent tag and the IP address of the HTTP request. Signature database 34 stores both pieces of information and accepts frequent updates to keep this data fresh. An example of an extract from signature database 34 is shown below:

| | |
|---|---|
| user-agent$TV36_Mercator_n2s7_A-1.0: | AltaVista |
| user-agent$TV36_Mercator_n2s7_B-1.0: | AltaVista |
| ip$128.177.243.*: | AltaVista |
| ip$128.177.244.*: | AltaVista |

Here, an AltaVista spider is recognized by its user-agent tag holding the phrases "TV36_Mercator_n2s7_A-1.0" or "TV36_Mercator_n2s7_B-1.0", or alternatively be recognizing it has an IP address between 128.177.243.1 and 128.177.243.255 or between 128.177.244 and 128.177.244.255. User-agent tags and IP addresses may also be identified explicitly to identify visitors as human and respond accordingly.

Associated Username and Password

It is also possible to take some traffic and assign it a username and password to allow it to access secure parts of a Web site. This occurs as part of the redirection process by providing the required user-id and password as used in a HTTP authentication process.

Generating Dynamic Pages

A key feature in the process of generating optimized dynamic pages, usually for search engine spiders, is the use of templates. Templates dictate how information is presented and thus what information is needed either from a database or from the provider of a Web site 20 through GUI 12. Each template has placeholders for dynamic content placed in careful locations within an HTML (Hyperlink Text Markup Language) page. Some of the typical pieces of information required include:

Title—the title of the web page

Keyphrase—with what words does the provider want to promote the Web Page for (i.e., what relevant search words would most likely be used by a person searching for this page, or more appropriately the page to which they have been redirected).

Keyphrase Concepts (up to 8)—Supporting sentences for the keyphrase without using the same words as the keyphrase.

Descriptive Sentence—a short description of the information held in this page

Text—a large amount of text that is used to populate the bulk of the generated Web page. This text usually is derived from the Web page to which a visitor is being redirected.

When using templates to publish data from a database (the "hidden web"), it is also important that the database fields are mapped to the template's placeholders with any additional manipulation functions being made available. To enhance this capability, IXC Engine 10 may leverage the versatility of the Perl programming language. Perl scripts can be used in the templates to allow the greatest flexibility in adding features and manipulating data to generate the most appropriate HTML pages for each search engine.

It should also be noted that the flexible nature of the templates and their application allows for non-HTML pages to also be generated from the data provided. This may include pages of the following format:

XML—eXtensible Markup Language (using any specified format definition); or

WAP—Wireless Application Protocol.

All pages created may also be presented to non-spider traffic. For example, a Web provider could generate a WAP version and make this available to human users browsing through their mobile phones. These can be identified by the user-agent string used by WAP-browsers.

The following is an excerpt from a template:

```
<HTML lang="<# system$language #>">
<HEAD>
<META HTTP-EQUIV="Content-Type" CONTENT="text/html; charset=<# system$charset #>"
    <META name="description" content="<# user$MetaDescription1 #>">
    <# system$MKW_tag #><# system$MetaRefresh #>
    <TITLE><# user$Title1 #></TITLE>
</HEAD>
<BODY>
<center>
<H1> <# user$KeyPhrase1:capital #> </H1>
<H2> <# user$KeyPhrase1:permutation:capital #> <# system$PageRandPunc #>
<# user$KeyWordConcept1 #> </H2>
</center>
<p><b><# user$KeyPhrase1:capital #></b>: <i><# system$text:sentence #></i>
    <h2><# user$KeyPhrase1:capital #> <# user$KeyWordConcept2:capital #></h2>
    <# system$Image1 #>
    <h3><# user$KeyWordConcept3:capital #></h3>
    <# system$first_paragraph #>
    <h2><# user$KeyWordConcept4:capital #></h2>
    <# system$linklist #>
    <# system$other_paragraphs #>
    <# system$DomainLink #></BODY>
</HTML>
```

A key feature of the IXC Engine 10 is that the templates may be updated (along with the spider signatures) automatically and remotely and that the templates drive the data requirements from both the GUI and the database perspective.

Redirection

As has been outlined in the preceding part of this application, there are multiple ways that a redirection can be determined. Before covering these in detail, the redirection process itself is covered as the same mechanism is used throughout the system.

The Redirection Process

IXC Engine 10 leverages the HTML standards for Server Response Codes. To explain this process, assume that the IXC Engine 10 controls (it may or may not generate a Web page depending on its use) the URL: http://www2.example.com/offer.htm and redirects human users who request this page to: http://www.example.com/bargain.htm. To perform a redirection, IXC Engine 10 performs the following actions (it is assumed that IXC Engine 10 is operating on a Web server that handles the subdomain www2.example.com):

- Receives a request (this could be from a search engine placement or other URL placement on the internet such as a banner advertisement) for a URL http://www2.example.com/offer.htm
- Determines that the request is from a human and that a redirection is required.
- Establishes that the redirect URL is: http://www.example.com/bargain.htm
- Issues a header with a response code 302 Moved Temporarily with the Location header URL set as http://www.example.com/bargain.htm The definition of this particular response code, in the working model, falling within the category of "Client Request Redirected, further action necessary", is as follows: Moved Temporarily—The requested URL has moved, but only temporarily. The Location header points to the new location. Immediately after receiving this status code, the client should use the new URL to resolve the request, but the old URL should be used for all future requests.

The temporary nature of the redirection ensures that multiple accesses from the same source of traffic will always request the original URL and not cache the redirect URL. This is important, as the IXC Engine allows for the redirect URL to be changed at any time with real time effect. As soon as this URL is changed the next person to request the original URL will be redirected to the newly entered redirect URL.

This same principle is used for all redirections. What will change is how this redirect URL is determined.

Additional information can be added to the redirection URLs which can identify the source of the redirected traffic (e.g. which search engine or which email campaign). This information then enriches the weblogs stored in the web server 20 rather than only having this information stored in the IXC Engine's logs. This enhances the information stored in the standard web logs used in all web servers.

Determining Redirect URL's

Given the basic principle of redirection described above, a number of mechanisms are available for determining the redirect URL. There are essentially two classes of redirect determination tasks—static and active. Within each of these classes several approaches are available. Static approaches available include:

- Simple—for each URL a redirect URL is explicitly assigned
- Smart—the redirect URL is determined according to a simple rule that places a primary key from a database into a URL mask
- Advanced—generates a redirect URL using pattern matching techniques found in the Perl programming language. It takes values from both the original URL as well as any of the fields in the database being used to populate the templates.

For Active Routing URLs, a list of static URLs are made available (entered by the administrator of the software). The available methods for determining which URL to use to redirect a visitor include:

- Random—select a URL at random from a list of static URLs
- Round Robin—take the next URL from a list (each subsequent visitor gets the next URL in the list starting from the beginning once the end of the list has been reached)
- Successful Conversion (Threshold Bound)—select URLs via the Random or Round Robin mechanism but keep track (tracking is covered in the next section) of each visitor to see if they reach a conversion page (a web page is designated as such a page). For each visitor that reaches this point increment a counter against the initially chosen URL. If this counter should reach a preset threshold limit, all subsequent traffic is then directed to this URL.
- Successful Conversion (Time Bound)—same as Successful Conversion (Threshold Bound) except that no threshold is set. Instead a time is set at which point the URL with the greatest number of conversions is the URL that all subsequent traffic is directed to.
- Target Limited—this also uses conversion counters as in the previous two approaches. For each URL in the list an upper bound is set for the number of conversions allowed. Visitors are directed to the next valid URL (random or round robin mechanism) where a valid URL is one that is in the list and has not yet reached its target limit. There must always be a default URL in case all URLs reach their limit.
- Date Restrictions—each URL in the list of static URLs has a date range to select from. Each visitor is redirected to the next (random/round robin) valid (according to the date) URL.

To reinforce these descriptions, several examples are now provided for the scenarios described above.

Simple Example

For each URL provided by IXC Engine 10, a static URL is assigned. This may easily be looked up as described in Step 520.

| IXC URL | Simple Redirect URL |
|---|---|
| http://www2.example.com/offer1.htm | http://www.example.com/bargain.html |
| http://www2.example.com/banner/test01.html | http://www.example.com/prod/may.html |

In both examples, a URL is mapped to a redirect URL. The redirect URL exists on the actual website (these could be static or dynamic pages). The IXC URLs can have any structure so long as the correct subdomain is used.

Smart Example

In smart redirects there is a database available (this could be a text file) with multiple fields for each record. One of the fields is a primary key (unique identifying field) for the database. The same database may be used multiple times and in different ways. Each use is called a campaign. The following extract of a database is used in the example (only a portion of the Description fields are shown). Note that the field ISBN is the primary key—it is a unique identifier for each record.

| ISBN | Title | Author Surname | Author Firstname | Description |
|------|-------|----------------|------------------|-------------|
| 01234567890 | Learn Java in a Day | Err | Prog M. | This book describes... |
| 23451220999 | How to Fly | Wright | Orville | Basic avionics are explored... |
| 88889393211 | Travel the US | Walker | Long | A walkers handbook... |

For each campaign, a mechanism for generating the IXC URL (from the data available) is set. This is constructed by choosing which fields from the database to use in the URL structure. For example, if we select the fields: Title and Surname, the IXC URLs would look as follows:

http://www2.example.com/Learn_Java_in_a_Day/Err/01234567890.html
http://www2.example.com/How_to_Fly/Wright/23451220999.html
http://www2.example.com/Travel_the_US/Walker/88889393211.html Next, each of the records using a simple redirect must have a redirect URL generated dynamically for them. This is accomplished by specifying three components that will make up the redirect URL: Stem, Primary Key, Tail. The following is an example of such a specification.

| IXC URL Stem | IXC URL Primary Key | IXC URL Tail |
|--------------|---------------------|--------------|
| http://www.example.com/book?isbn= | <#ISBN#> | &detail=yes |

This would generate the following URLs for the above examples:

http://www.example.com/book?isbn=01234567890&detail=yes
http://www.example.com/book?isbn=23451220999&detail=yes
http://www.example.com/book?isbn=88889393211&detail=yes Using the Simple Redirect approach has wide use for systems that utilize the primary key to generate a dynamic page.

Advanced Redirect

The advanced redirect mechanism uses the same process for generating the IXC URL, but uses a much more sophisticated process to generate the redirect URL. It has two parts: the Match Path and the Redirect Specification. The Match Path matches the incoming URL that is, the IXC URL. This allows extensive use of the IXC URL as it can have additional information added to it and then incorporated into the redirect URL. Both use the Perl protocol for specifying a regular expression for the Match Path and the redirect specification.

Multiple Matching Paths may be specified. The first one that matches will then have its redirect specification enacted to generate the redirect URL. Should no Matching Path match the IXC URL, a default URL will be used.

The following example shows how the Advanced Redirect can be used.

| Match Path | Redirect Specification |
|------------|------------------------|
| Wright/(.*?)/.* | http://www.example.com/author=<db$AuthorSurname#> |
| .*?/.*\.htm.* | http://www.example.com/isbn=<#match$2#> |

In the first example, a match will occur whenever a URL has "Wright" in the midst of the IXC URL. This will then cause a Redirect URL to be generated using Author's surname that comes from the database entry for that record (the correct record is chosen based on the primary key information held in the IXC URL).

In the second example, the match is made with any IXC URL and the Redirect URL is generated by using the information held in the IXC URL. In this case, the second matching component (the part preceding the ".htm") is used to build up this URL.

These two examples show some simple uses of the database and matching components in building up a Redirect URL.

Random Redirect Selection Example

In selecting an Active Routing URL through Random selection, a list of static URLs is specified as follows. The following static URLs are assigned for the defined active URL www2.example.com/active/offers.htm:

http://www2.example.com/active/offers.htm http://www.example.com/testoffers/offer1.htm
http://www.example.com/testoffers/offer2.htm
http://www.example.com/testoffers/offer3.htm Whenever any visitor clicks on the URL http://www2.example.com/active/offers.htm, (this URL may be embedded in a banner advertisement, affiliate link, email or a search engine result) they will be taken to one of the three "offer" URLs within the www.example.com website—chosen at random.

Round Robin Example

Using the example shown in the Random Example, if Round Robin were used, each visitor using the URL would be sent to the next URL in the list. The following table shows an example of redirections that would occur for the first 5 visitors to the URL http://www2.example.com/active/offers.htm:

| Visitor # to http://www2.example.com/active/offers.htm | Redirect URL |
|---|---|
| 1 | http://www.example.com/testoffers/offer1.htm |
| 2 | http://www.example.com/testoffers/offer2.htm |

-continued

| Visitor # to http://www2.example.com/active/offers.htm | Redirect URL |
|---|---|
| 3 | http://www.example.com/testoffers/offer3.htm |
| 4 | http://www.example.com/testoffers/offer1.htm |
| 5 | http://www.example.com/testoffers/offer2.htm |

Successful Conversion (Threshold Bound) Example

In this example, a list of static URLs(use the previous example's list) is appended with a threshold value and a page marker (described in a later section) that indicates a successful conversion. A successful conversion therefore, is a visitor clicking through this URL (http://www2.example.com/active/offers.htm) and (during the same online session) arriving at the indicated page.

In this example, a threshold of "3" is set, and a selected page is marked. Since either Random or Round Robin may be used to select the next Redirect URL initially, it is assumed that Round Robin has been selected. If the selected page is reached by any visitors, a counter is updated for that redirect URL. The following table shows an example of some interactions. For ease of depiction, the Redirect URLs are abbreviated as follows: "http://www.example.com/testoffers/offer1.htm" is depicted by "offer1.htm". Also, "counter1" will signify the counter associated with offer1.htm, "counter2" will signify the counter associated with offer2.htm, and so on.

| Visitor # | Redirect URL | Successful? | Action |
|---|---|---|---|
| 1 | offer1.htm | Yes | counter1=1 |
| 2 | offer2.htm | Yes | counter2=1 |
| 3 | offer3.htm | No | No action |
| 4 | offer1.htm | Yes | counter1=2 |
| 5 | offer2.htm | No | No action |
| 6 | offer3.htm | Yes | counter3=1 |
| 7 | offer1.htm | Yes | counter1=3, threshold reached |
| 8 | offer1.htm | Yes | No action |
| 9 | offer1.htm | No | No action |

Visitor 7 converting takes the counter for offer1.htm over the threshold "3" and hence all subsequent visitors are taken to offer1.htm.

Successful Conversion (Time Bound) Example

In this example, conversion works identically to conversion as in the previous example, except that instead of tracking a threshold, at a certain time the offer with the highest counter is selected for all subsequent redirects. Using the same example as above, we set the artificial time for the decision to be 12 noon.

| Visitor # | Time | Redirect URL | Successful? | Action |
|---|---|---|---|---|
| 1 | 09:00 AM | offer1.htm | Yes | counter1 = 1 |
| 2 | 09:30 | offer2.htm | Yes | counter2 = 1 |
| 3 | 10:00 | offer3.htm | No | No action |
| 4 | 10:15 | offer1.htm | Yes | counter1 = 2 |
| 5 | 11:45 | offer2.htm | No | No action |
| 6 | 11:50 | offer3.htm | Yes | counter3 = 1 |
| 7 | 11:55 | offer1.htm | Yes | counter1 = 3 |
| 8 | 12:05 PM | offer1.htm | Yes | counter1 has highest |
| 9 | 12:10 | offer1.htm | No | No action |

The only difference in this case is that the highest counter is chosen at a given time rather than a threshold value.

Target Limited Example

In this example, each redirect URL has an associated threshold associated with it. As in the previous examples, a counter is updated for each successful conversion. Once the threshold has been reached for a particular URL, no further redirects are sent to it.

The following test data is used (based on previous examples):

| http://www2.example.com/active/offers.htm | Threshold Value |
|---|---|
| http://www.example.com/testoffers/offer1.htm | 3 |
| http://www.example.com/testoffers/offer2.htm | 6 |
| http://www.example.com/testoffers/offer3.htm | 10 |

Using this test data and assuming Round Robin is used to select from available redirect URLs and similar schemes for counter maintenance, these results follow:

| Visitor # | Redirect URL | Successful? | Action |
|---|---|---|---|
| 1 | offer1.htm | Yes | counter1 = 2 |
| 2 | offer2.htm | Yes | counter2 = 5 |
| 3 | offer3.htm | No | No action |
| 4 | offer1.htm | Yes | counter1 = 1 |
| 5 | offer2.htm | No | No action |
| 6 | offer3.htm | Yes | counter3 = 9 |
| 7 | offer1.htm | Yes | counter1 = 0 (no more) |
| 8 | offer2.htm | Yes | counter2 = 4 |
| 9 | offer3.htm | No | No action |
| 10 | offer2.htm | Yes | counter2 = 3 |
| 11 | offer3.htm | Yes | counter3 = 8 |

As demonstrated in this example, after visitor 7, offer1.htm is no longer used as it has reached its threshold value and is no longer valid.

Date Restrictions

This example demonstrates how date or time restrictions can influence which Redirect URLs are selected. For each redirect URL, a valid date range must be used. This is shown in the following table:

| http://www2.example.com/active/offers.htm | Valid From | Valid To |
|---|---|---|
| http://www.example.com/testoffers/offer1.htm | 04-Jan-2001 | 04-Jan-2001 |
| http://www.example.com/testoffers/offer2.htm | 04-Jan-2001 | 10-Jan-2001 |
| http://www.example.com/testoffers/offer3.htm | 11-Jan-2001 | 15-Jan-2001 |
| http://www.example.com/testoffers/offers.htm | DEFAULT | DEFAULT |

Using this test data (assuming Round Robin for multiple valid choice selection) these results follow:

| Visitor # | Date | Redirect URL |
|---|---|---|
| 1 | 4-Jan-2001 | offer1.htm |
| 2 | 4-Jan-2001 | offer2.htm |
| 3 | 4-Jan-2001 | offer1.htm |
| 4 | 5-Jan-2001 | offer2.htm |
| 5 | 5-Jan-2001 | offer2.htm |
| 6 | 12-Jan-2001 | offer3.htm |
| 7 | 15-Jan-2001 | offer3.htm |
| 8 | 16-Jan-2001 | offers.htm |
| 9 | 16-Jan-2001 | offers.htm |

This example demonstrates that only offers valid for the visitor's visit date are selected. For dates outside of all the valid date ranges, a default Redirect URL ("offers.htm") is used for all Redirect URLs.

Tracking

Tracking uses Redirection and cookies to track visitors through a Web site. This is accomplished by placing an image on a page that needs to be tracked. The image is placed using a standard HTML image reference, and could look as follows:

```
<IMG HEIGHT = "1" WIDTH = "1" SRC =
"http://www2.example.com/tracker/contents.gif">
```

The URL used is an IXC URL that will require a Simple Redirection to a real GIF file that is in fact invisible. The IXC URL is classified internally as a tracking URL and thus requires a cookie to be associated with the IMG request. If no cookie is supplied then one is allocated. Note the following with respect to cookies:

They can be permanent or session based
They ONLY contain a unique identifier (number) so that hold NO personal identifying information
They are associated with the Domain used—in the example above they are associated with all subdomains that use example.com as part of the domain specification
Once allocated to a visitor they are passed with all subsequent requests to the installation of IXC that uses this domain.

The cookies are also allocated whenever any visitor uses any of the IXC URLs. This allows the identification of the initial source of a visitor assuming that an IXC URL is used for each of the sources of visitor traffic: Search Results, Banner Advertisements, Affiliate Links, Email campaigns. Visitor traffic that arrives directly at the actual website will have a source identification of the first tracking IXC URL that it comes across—this identifies where the visitor was first noticed.

With the trackers in place, visitor traffic can be reported on with the following information:
Initial source of the visitor traffic
Which pages were visited (that were marked with unique image references)
How long a visitor stays on a page (time to next movement)
Where visitors leave a site from (last page visited in a session)
Other details passed with the image reference (discussed in later section)

Reporting on the above statistics and metrics using these facts are created. Additional information can be gathered and reported on and is covered in a later section.

Cache Busting

To speed up downloads many Internet Service Providers (ISPs) and businesses use caching. Caching stores pages accessed by persons connected via their Internet services so that persons accessing the same page may use a local copy rather than getting a new copy of the page directly from the issuing Web site. This can cause problems with the image markers used in tracking as cached image references will not access the IXC Engine to access the marker and hence will not update the IXC logs.

To circumvent this problem, advanced markers are employed which use Java-script to generate what appears to be a unique marker reference for each access of the markers. This is done by appending a timestamp, which is ignored by the IXC Engine, but seen by the caching software as a unique URL. An example of the Java-script code is shown below:

```
<NOSCRIPT>
    <IMG HEIGHT="1" WIDTH="1"
SRC="http://www2.example.com/tracker/contents.gif?js=no">
</NOSCRIPT>
<SCRIPT LANGUAGE="JavaScript">
    var d = new Date();
    document.write("<IMG HEIGHT=\"1\" WIDTH =\"1\"
SRC=\"http://www2.example.com/tracker/contents.gif?ts=");
    document.write(escape(d.getTime()));
    var r = Math.random();
    document.write("&r=");
    document.write(escape(r));
    document.write("\">");
</SCRIPT>
```

This script ensures that any browsers that can't handle Java-script will run the normal image reference with a reference saying Javascript was not available, otherwise it generates a unique image reference using a timestamp and thus "cache-busting".

Tracking with Additional Information

As was shown in the previous section, additional information may be passed with the image references. In the previous case, it was either a timestamp or simply a note to indicate that Java-script was not available—"?js=no". This information is logged and if needed reported.

Information that is useful to gather includes the value of conversions mentioned in previous sections. This is done by including a reference to the value variable (stored in the IXC Engine for reference) and then the value of the conversion.

A simpler image reference example (the more complex Java-script code is amended in a similar way) could appear:

```
<IMG HEIGHT="1" WIDTH="1"
SRC="http://www2.example.com/tracker/sale.gif?value=%ordervalue">
```

In this example, the variable stored within the IXC Engine "value" and the variable found on the tagged web page is "%ordervalue". This "%ordervalue" variable is part of the web page that has been marked and will be replaced by the value it holds when the marked web page is generated.

Reporting on Additional Information

As well as the content provided via the markers, other information is also sent along in the logging process. Most importantly, the referring URL is logged. This is the URL used to generate the web page that the marker has been placed on. The following is an example of such a URL:

```
http://www.example.com/Style.view?merchantid=11&prodCode=1234&Color=BL
```

This information can be processed in reports to enhance the data being shown in the clickpath. If merged with external data (e.g. product descriptions) it could add much more meaning to reports and allow different reporting views.

Tracking Retention E-Mail Traffic

For web traffic generated through retention email, it is possible to track with more detail. An email campaign is the result of creating an email template that has several URLs embedded in the message. The objective is to get existing customers, who have supplied their email address and given their consent to be sent email offers, to click on these URLs and perform some action (e.g. purchase, signup etc).

To allow more detailed tracking, each email that is sent can have an identifier built into its URLs that identifies the recipient of the email. With this information, the source of the traffic can be identified to the recipient of the email allowing reporting to not only show whether the email campaign was successful for each recipient, but also allowing more detailed tracking of what each recipient does on the web site.

This information can then be used to refine subsequent email campaigns by taking into account recipients actions to previous email campaigns.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. Method of enhancing web page delivery, comprising the steps of:
    distributing URL links across the Internet wherein said URL links include marketing links and search engine search results, said URL links created through a marketing control engine, and wherein said URL links point to said marketing control engine in that humans who click on said URL links over a network are sent to said marketing control engine;
    redirecting human visitors, who click on said URL links, from said marketing control engine to a web page, in an existing web site, that corresponds to said clicked URL link;
    logging redirections, of human visitors, for reporting to an online marketer;
    tracking movements of said human visitors across said existing web site of said online marketer;
    receiving a request from a requestor, through said marketing control engine, for a web page content for a target web page;
    identifying the requestor as either a human visitor or a search engine spider by examining a user-agent tag and an IP address of an HTTP request of the requestor, and comparing the user-agent tag and the IP address with requesting agent characteristics;
    dynamically creating a virtual web page, for said target web page, wherein content of said virtual web page is tailored to a specific search engine to increase search engine rankings for said target web page, and wherein said virtual web page provides linking data designed so that a search engine search result for said target web page contains a URL link that points to said marketing control engine;
    delivering said virtual web page to said search engine spider;
    logging visits by search engine spiders, for reporting to said online marketer;
    analyzing web traffic generated through said marketing control engine.

2. The method according to claim 1, wherein the request for a web page content is received via a Uniform Resource Locator (URL) link published or stored in the Internet.

3. The method of claim 2, wherein the URL link includes banner advertisements.

4. The method of claim 2, wherein the URL link includes affiliate links.

5. The method of claim 2, wherein the URL link includes e-mail campaigns.

6. Method of enhancing web page delivery, comprising the steps of:
    distributing URL links across the Internet wherein said URL links include marketing links and search engine search results, said URL links created through a marketing control engine, and wherein said URL links point to said marketing control engine in that humans who click on said URL links over a network are sent to said marketing control engine;
    redirecting human visitors, who click on said URL links, from said marketing control engine to a web page, in an existing web site, that corresponds to said clicked URL link;
    logging redirections, of human visitors, for reporting to an online marketer;
    tracking movements of said human visitors across said existing web site of said online marketer;
    receiving a request from a requestor, through said marketing control engine, for a web page content for a target web page;

identifying the requestor as either a human visitor or a search engine spider;

dynamically creating a virtual web page, for said target web page, wherein content of said virtual web page is tailored to a specific search engine to increase search engine rankings for said target web page, and wherein said virtual web page provides linking data designed so that a search engine search result for said target web page contains a URL link that points to said marketing control engine;

delivering said virtual web page to said search engine spider; and logging visits by search engine spiders, for reporting to said online marketer.

7. The method of claim 6, wherein different web pages are dynamically generated depending upon the particular search engine spider identified as the requestor.

8. The method of claim 6, wherein updateable templates are merged with user entered data to dynamically generate the one or more web sites.

9. The method of claim 6, wherein updateable templates are merged with information stored in a catalog database to dynamically generate the one or more web sites.

10. The method of claim 6, wherein the redirecting is accomplished via a redirect URL.

11. The method of claim 10, further comprising the step of: updating in real time the redirect URL without affecting the existing URL.

12. The method of claim 10, further comprising the step of: automatically changing the redirect URL based on real time state information which can be influenced by the interaction of other requestors of web page content.

13. The method of claims 1 or 6, further comprising the step of: logging for later reporting and dissemination all requests and actions taken.

14. The method of claim 13, further comprising the steps of: identifying the source link from which a human visitor requests a web page content; and tracking via use of redirection with an IMAGE tag the human visitor across a plurality of web pages.

15. The method of claim 14, whereby tracking occurs across multiple domains.

16. The method of claim 14, further including the step of: supplementing with additional dynamic code around the IMAGE tag in order to ensure that every request for the IMAGE is unique and to avoid caching the IMAGE data, thereby forcing each request to be processed uniquely.

17. The method of claim 14, further including the step of: logging additional information including an email address to which a link was redirected, a referror URL and all information stored there.

18. The method of claim 14, further including the step of: logging additional information including the value of a any transactions occurring during a human visitor's visit on a web page, a referror URL and all information stored there.

19. The method of claim 13, wherein a redirect URL includes information regarding the source of web traffic being logged.

20. Apparatus for enhanced web page delivery, comprising:

a web server adapted to receive a request for web page content from a requestor;

and a control engine operating on the web server, the control engine adapted to execute the process steps of;

distributing URL links across the Internet wherein said URL links include marketing links and search engine search results, said URL links created through said marketing control engine, and wherein said URL links point to said marketing control engine in that humans who click on said URL links over a network send a request to said marketing control engine, redirecting human visitors, who click on said URL links, from said marketing control engine to a web page, in an existing web site, that corresponds to said clicked URL link, logging redirections, of human visitors, for reporting to an online marketer, tracking movements of said human visitors across said existing web site of said online marketer, receiving a request from a requestor, through said marketing control engine, for a web page content for a target web page, identifying the requestor as either a human visitor or a search engine spider, dynamically creating a virtual web page, for said target web page, wherein content of said virtual web page is tailored to a specific search engine to increase search engine rankings for said target web page, and wherein said virtual web page provides linking data designed so that a search engine search result for said target web page contains a URL link that points to said marketing control engine, delivering said virtual web page to said search engine spider, logging visits by search engine spiders, for reporting to said online marketer, and analyzing web traffic generated through said marketing control engine.

21. Computer-executable process steps stored on a computer-readable medium, the computer-executable process steps to enhance web page delivery, the computer-executable process steps comprising:

code for distributing URL links across the Internet wherein said URL links include marketing links and search engine search results, said URL links created through a marketing control engine, and wherein said URL links point to said marketing control engine in that humans who click on said URL links over a network send a request to said marketing control engine;

code for redirecting human visitors, who click on said URL links, from said marketing control engine to a web page, in an existing web site, that corresponds to said clicked URL link, via a redirect URL;

code for logging redirections, of human visitors, for reporting to an online marketer;

code for tracking movements of said human visitors across said existing web site of said online marketer;

code to receive a request from a requestor, at said marketing control engine, for web page content for a target website;

code for identifying the requestor as a human visitor or a search engine spider;

code for dynamically creating a virtual web page, for said target web page, wherein content of said virtual web page is tailored to a specific search engine to increase search engine rankings for said target web page, and wherein said virtual web page provides linking data designed so that a search engine search result for said target web page contains a URL link that points to said marketing control engine;

code for delivering said virtual web page to said search engine spider;

logging visits by search engine spiders for reporting to said online marketer; and analyzing web traffic generated through said marketing control engine.

22. Apparatus for enhanced web page delivery, comprising:
- a signature database adapted to maintain characteristics mapped to names of requesting agents;
- a content database adapted to maintain textual web content, and textual data concerning audio, visual, multimedia and dynamic web content;
- a template database adapted to maintain Hyperlink templates; and
- a web server adapted to execute the process steps of:
    - distributing URL links across the Internet wherein said URL links include marketing links and search engine search results, said URL links created through a marketing control engine, and wherein said URL links point to said marketing control engine in that humans who click on said URL links over a network are sent to said marketing control engine;
    - redirecting human visitors, who click on said URL links, from said marketing control engine to a web page, in an existing web site, that corresponds to said clicked URL link via a redirect URL and tracking human visitors across a plurality of web pages;
    - logging redirections, of human visitors, for reporting to an online marketer;
    - tracking movements of said human visitors across said existing web site of said online marketer;
    - receive a request from a requestor, through said marketing control engine, for a web page content for a target web page;
    - identifying the requestor as a human visitor or a search engine spider using the signature database;
    - selecting a template from the template database, the template having a Hyperlink structure tailored to a specific search engine wherein the Hyperlink structure is formatted based on search engine ranking criteria of said specific search engine;
    - dynamically creating a virtual web page, for said target web page, by merging content data from the content database with the template, wherein content of said virtual web page is tailored to said specific search engine, and wherein said virtual web page provides linking data designed so that a search engine search result for said target web page contains a URL link that points to said marketing control engine;
    - delivering said virtual web page to said search engine spider;
    - logging visits by search engine spiders for reporting to said online marketer; and
    - analyzing web traffic generated through said marketing control engine.

23. The apparatus of claim 22 wherein redirection is based on previous traffic visits and redirections.

* * * * *

UNITED STATES PATENT AND TRADEMARK OFFICE
CERTIFICATE OF CORRECTION

| | | |
|---|---|---|
| PATENT NO. | : 7,260,774 B2 | Page 1 of 1 |
| APPLICATION NO. | : 09/845575 | |
| DATED | : August 21, 2007 | |
| INVENTOR(S) | : John H. Lambert et al. | |

It is certified that error appears in the above-identified patent and that said Letters Patent is hereby corrected as shown below:

In the Claims:

Col. 20 in claim 2, line 38, replace "according to" with --of--.

Col. 20 in claim 6, line 7, replace "so" with --to--.

Col. 20 in claim 6, line 9, replace "said" with --a--.

Col. 20 in claim 6, line 13, delete "," before --for reporting to--.

Col. 22 in claim 20, line 16, delete "either" before --a human visitor--.

Col. 22 in claim 20, line 25, replace "said" with --a--.

Col. 23 in claim 22, line 2, delete "a" before --web page content--.

Signed and Sealed this

Twenty-third Day of October, 2007

JON W. DUDAS
*Director of the United States Patent and Trademark Office*